(12) United States Patent
Carapella et al.

(10) Patent No.: US 10,509,187 B2
(45) Date of Patent: Dec. 17, 2019

(54) UNIVERSAL MULTI-PURPOSE COMPARTMENTALIZED TELECOMMUNICATIONS BOX

(71) Applicant: PPC BROADBAND, INC., East Syracuse, NY (US)

(72) Inventors: Peter A. Carapella, Fayetteville, NY (US); Noah P. Montena, Syracuse, NY (US); Brian K. Hanson, Cicero, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 15/882,345

(22) Filed: Jan. 29, 2018

(65) Prior Publication Data
US 2018/0252888 A1    Sep. 6, 2018

Related U.S. Application Data

(63) Continuation-in-part of application No. 14/964,568, filed on Dec. 9, 2015, now Pat. No. 9,882,362, which
(Continued)

(51) Int. Cl.
*G02B 6/44* (2006.01)
*H02G 3/08* (2006.01)
(Continued)

(52) U.S. Cl.
CPC ......... *G02B 6/4446* (2013.01); *G02B 6/4452* (2013.01); *G02B 6/4454* (2013.01);
(Continued)

(58) Field of Classification Search
CPC .... G02B 6/4446; G02B 6/445; G02B 6/4448; H02G 3/081; H02G 3/086; H02G 3/088; H02G 3/083
See application file for complete search history.

(56) References Cited

U.S. PATENT DOCUMENTS

| 4,850,014 A | 7/1989 | Gillis et al. |
| 4,998,894 A | 3/1991 | Gronvall |

(Continued)

FOREIGN PATENT DOCUMENTS

| DE | 19740246 C1 | 2/1999 |
| WO | 0165295 A1 | 9/2001 |

(Continued)

OTHER PUBLICATIONS

Feb. 5, 2016 Search Report issued in International Application No. PCT/US2015/064851.
(Continued)

*Primary Examiner* — Peter Radkowski

(57) ABSTRACT

A compartmentalized enclosure for controlling access to different components in a telecommunications system including a lower housing member shaped to define an outer perimeter portion and a cavity, a panel member configured to move between a closed panel position, where the panel member prevents access to equipment within the cavity, and an open panel position, where the panel member permits access to the cavity, wherein the panel member is disposed in the cavity of the lower housing member, and is shaped to define a inner perimeter portion that is configured to substantially match and fit within the outer perimeter portion of the lower housing member so as to form a substantially perimeter matching portion that prevents access to equipment within the cavity between the inner perimeter portion and the outer perimeter portion when the panel member is in the closed position.

47 Claims, 14 Drawing Sheets

Related U.S. Application Data is a continuation-in-part of application No. 14/863,427, filed on Sep. 23, 2015, now Pat. No. 9,952,397.

(60) Provisional application No. 62/089,587, filed on Dec. 9, 2014, provisional application No. 62/053,850, filed on Sep. 23, 2014.

(51) Int. Cl.
*H02B 1/40* (2006.01)
*H02G 3/18* (2006.01)
*H02G 3/14* (2006.01)

(52) U.S. Cl.
CPC .............. *H02B 1/40* (2013.01); *H02G 3/083* (2013.01); *H02G 3/086* (2013.01); *H02G 3/14* (2013.01); *H02G 3/18* (2013.01)

(56) References Cited

U.S. PATENT DOCUMENTS

| | | | |
|---|---|---|---|
| 5,029,958 A | 7/1991 | Hodge et al. | |
| 5,274,731 A | 12/1993 | White | |
| 5,420,958 A | 5/1995 | Henson et al. | |
| 5,668,911 A | 9/1997 | Debortoli | |
| 5,721,396 A | 2/1998 | Daoud | |
| 5,892,872 A | 4/1999 | Glover | |
| 6,118,868 A * | 9/2000 | Daoud ................... | H02G 3/081 379/413.02 |
| 6,242,697 B1 | 6/2001 | Gerken et al. | |
| 6,264,056 B1 | 7/2001 | King | |
| 6,265,670 B1 | 7/2001 | Duesterhoeft et al. | |
| 6,282,285 B1 | 8/2001 | Daoud | |
| 6,427,045 B1 | 7/2002 | Matthes et al. | |
| 6,661,961 B1 * | 12/2003 | Allen ................... | G02B 6/3831 385/135 |
| 7,198,409 B2 | 4/2007 | Smith et al. | |
| 7,233,731 B2 | 6/2007 | Solheid et al. | |
| 7,349,616 B1 | 3/2008 | Castonguay et al. | |
| 7,397,997 B2 | 7/2008 | Ferris et al. | |
| 7,493,003 B2 * | 2/2009 | Kowalczyk .......... | G02B 6/4452 385/135 |
| 7,660,409 B1 | 2/2010 | Czerwiec et al. | |
| 7,672,450 B2 | 3/2010 | Paulsen | |
| 7,737,360 B2 | 6/2010 | Wiemeyer et al. | |
| 7,751,675 B2 | 7/2010 | Holmberg et al. | |
| 7,809,233 B2 | 10/2010 | Smith et al. | |
| 7,809,234 B2 | 10/2010 | Smith et al. | |
| 7,816,602 B2 | 10/2010 | Landry et al. | |
| RE42,258 E | 3/2011 | Thompson et al. | |
| 8,020,813 B1 | 9/2011 | Clark et al. | |
| 8,244,090 B2 | 8/2012 | Kutsuzawa | |
| 8,254,741 B2 | 8/2012 | Imaizumi et al. | |
| 8,263,861 B2 | 9/2012 | Landry et al. | |
| 8,705,929 B2 | 4/2014 | Kowalczyk et al. | |
| 8,811,791 B2 | 8/2014 | Solheid et al. | |
| 8,938,147 B2 | 1/2015 | Krampotich et al. | |
| 9,008,483 B2 | 4/2015 | Larsson et al. | |
| 9,122,021 B2 | 9/2015 | Elenbaas et al. | |
| 9,151,922 B2 | 10/2015 | Claessens et al. | |
| 9,201,206 B2 | 12/2015 | Smith et al. | |
| 2005/0276562 A1 | 12/2005 | Battey et al. | |
| 2006/0067522 A1 | 3/2006 | Paulsen | |
| 2006/0153516 A1 | 7/2006 | Napiorkowski et al. | |
| 2006/0269216 A1 | 11/2006 | Wiemeyer et al. | |
| 2007/0272440 A1 | 11/2007 | Grunwald et al. | |
| 2008/0279521 A1 * | 11/2008 | Kowalczyk .......... | G02B 6/4452 385/135 |
| 2009/0202214 A1 | 8/2009 | Holmberg et al. | |
| 2009/0238531 A1 | 9/2009 | Holmberg et al. | |
| 2009/0310927 A1 | 12/2009 | Riggsby et al. | |
| 2009/0314907 A1 | 12/2009 | Romerein et al. | |
| 2010/0074578 A1 | 3/2010 | Imaizumi et al. | |
| 2010/0329622 A1 | 12/2010 | Kutsuzawa | |
| 2011/0013875 A1 | 1/2011 | Bran de Leon et al. | |
| 2011/0242735 A1 | 10/2011 | Landry et al. | |
| 2011/0305422 A1 | 12/2011 | Thompson et al. | |
| 2012/0248112 A1 | 10/2012 | Amidon et al. | |
| 2012/0321268 A1 | 12/2012 | Claessens et al. | |
| 2014/0023334 A1 | 1/2014 | Larsson et al. | |

FOREIGN PATENT DOCUMENTS

| | | |
|---|---|---|
| WO | 02071123 A1 | 9/2002 |
| WO | 2005045487 A2 | 5/2005 |
| WO | 2005045487 A3 | 8/2005 |
| WO | 2012138856 A1 | 10/2012 |

OTHER PUBLICATIONS

Feb. 18, 2016 Office Action Issued in U.S. Appl. No. 14/964,568.
Oct. 21, 2016 Office Action Issued in U.S. Appl. No. 14/964,568.
Dec. 11, 2015 International Search Report issued in International Application No. PCT/US2015/051802.
Jul. 1, 2016 Office Action Issued in U.S. Appl. No. 14/863,427.
FieldSmart Fiber Scalability Center (FSC) Installation Manual, http://www.clearfieldconnection.com/products/cabinets/pon-cabinets.html, pp. 1-60, 2014.
FieldSmart Fiber Scalability Center (FSC) PON Cabinets Data Sheet, http://www.clearfieldconnection.com/products/cabinets/pon-cabinets.html, pp. 1-6.
Clearfield Clearview Blue Cassette Data Sheets, http://www.clearfieldconnection.com/products/cassettes.html, pp. 1-4.
Clearview Classic Cassette Data Sheets, http://www.clearfieldconnection.com/products/cassettes.html, pp. 1-4.
Mar. 28, 2017 Search Report issued in International Application No. PCT/US2015/051802.
May 16, 2019 Office Action issued in U.S. Appl. No. 15/819,989.

* cited by examiner

UNIVERSAL MULTI-PURPOSE COMPARTMENTALIZED TELECOMMUNICATIONS BOX

CROSS-REFERENCE TO RELATED APPLICATIONS

This application is a continuation-in-part of U.S. patent application Ser. No. 14/964,568, filed Dec. 9, 2015, pending, which is a continuation-in-part of U.S. patent application Ser. No. 14/863,427, filed Sep. 23, 2015, which claims the benefit of priority of U.S. Provisional Patent Application No. 62/053,850, filed Sep. 23, 2014, both of which are incorporated herein by reference in their entirety. This application also claims the benefit of priority of U.S. Provisional Patent Application No. 62/089,587, filed Dec. 9, 2014, which is incorporated herein by reference in its entirety.

BACKGROUND

Cable and/or Internet service providers may offer a variety of transmission technologies (e.g., radio, telephone, coaxial cable, twisted pair, fiber optic, broadband, wireless broadband, and satellite communications). Generally speaking, with the exception of antenna-based systems, these telecommunication system services are routed via a signal-carrying cable (e.g., coaxial) to a subscriber's residence or office. Before entering a subscriber's residence/office, such cables generally pass through a secure enclosure (i.e., "house box," or "entry box"). During, for example, residential installation of cable service, the house box provides access to certain components necessary for installation of the cable service (e.g., coaxial male and female connectors that must be connected), installing a splitter (providing service connection endpoints to multiple locations within the residence/office), and/or installing an amplifier (boosting a signal being conveyed to a distal location within the residence/office).

House boxes (configured for telecommunication system components) are generally known. However, the majority of conventional house boxes are configured to house only telecommunication system components made by and/or for a specific manufacturer. Thus, with a telecommunications system installation requires telecommunication system components made by and/or for different manufacturers, service providers may need to place separate boxes on, for example, a homeowner's (residential) property to accommodate the telecommunication system components of different manufacturers. The use of multiple component installation (house) boxes on a subscriber's residential property is undesirable both technically and esthetically.

Recently, some manufacturers have provided a large-size custom-built box on demand, but, as discussed above, conventional boxes are completely silent regarding providing access to certain components (e.g., RF equipment) while preventing access to (or hiding) other components (e.g., fiber optics components). For example, a service provider may desire to prevent access to components (e.g., fiber components) by individuals who do not have the requisite training to access those components (e.g., an untrained installation technician, residents who are attempting to install cable service on their own). Moreover, there is a desire for a small overall footprint of any telecommunications boxes on a property (because telecommunications boxes are generally not atheistically pleasing).

In a conventional telecommunication service installation in a conventional box, the technician must possess requisite knowledge of multiple systems each requiring a different skill or proficiency level. For example, an installation procedure may require the combined proficiency in each of fiber optic, coaxial and data communications systems. To address these requirements, a service provider may try training all technicians to the highest possible skill level (ensuring each technician an installation can be performed by a single technician). Alternatively, the service provider may try and manage technicians such that the "right" technician for the task at hand is delegated for the task. While this practice may result in greater efficiency, it may also adversely impact performance (e.g., if the installation is performed incorrectly). With respect to the latter, a technician installing coaxial cable may be unfamiliar with the intricacies of fiber optic cable (e.g., such as a need to maintain a minimum permissible bend radius to maintain signal integrity). In fiber-optic cables, the minimum permissible bend radius is very important. That is, inadvertently bending a fiber-optic cable beyond its permissible bend radius can result in a loss of signal performance.

Further, conventional secure enclosures do not: (i) adequately segregate portions of the enclosure which effect fiber optic and coaxial cable connections (ii) maintain proper fiber management, and (iii) provide laser safety. As a consequence, service providers place the equipment in separate/distinct/secure entry enclosures which are both technically inadequate and aesthetically unpleasing/unappealing.

Therefore, there is a need to overcome, or otherwise lessen the effects of, the disadvantages and shortcomings described above. For example, utilizing a telecommunication box according to the disclosure has, as an example, the advantage of allowing for error free installation of components related to a second telecommunication system (e.g., RF equipment, coaxial splitters) in an enclosable box that provides a hidden, nested compartment for equipment related to a first telecommunication system (e.g., fiber components), thus protecting the first telecommunication from harm, even if inadvertent (e.g., by an individual (service provider technician) who does not possess fiber optics handling training), while maintaining a relatively small overall footprint.

SUMMARY

The present disclosure relates to the above-mentioned telecommunication technologies; particularly, enclosable house boxes and methods for installing telecommunication components. Installation of telecommunication components includes installation, removal, and modification of telecommunication components. In particular, the disclosure provides a universal multi-purpose enclosure or enclosable house box for one or more types of telecommunication system components, for example, a multi-purpose box that provides both RF network and fiber optic telecommunication systems. The multi-purpose house box may be configured to have an internal cavity that is large enough to allow the service provider flexibility in choosing and exchanging various components of various telecommunication systems of a variety of sizes (e.g., different telecommunication systems types, styles, and manufacturers). The present disclosure shows an embodiment including an easily accessible RF equipment (coaxial cable) telecommunication system, and a less accessible fiber telecommunication system component(s). It should be appreciated that it may be desirable to configure the box to house different types/sizes of telecommunication equipment.

In this embodiment, the universal house box may be configured to ensure safe and effective fiber handling (first telecommunication system), while allowing easy access for RF network changes and modifications (second telecommunication system). To do such, the enclosable box may provide an internal compartment panel that may enclose, protect, and limit access to a first type of telecommunication system, such as, fiber components thereby minimizing inadvertent human error directed at/received by the second type of telecommunications system. In addition, the compartment panel and universal house box may be configured such that a second type of telecommunication system (e.g., non-fiber components such as RF components) may be provided in the space remaining within the box outside of the compartment created by/underneath the panel. Further, an upper surface of the panel may be configured to be mountable/attachable with a second communication system type component (e.g., a splitter or amplifier for an RF communication system). With the universal, multi-purpose house box, a telecommunications service provider may use only one box (instead of two boxes) to house both a first telecommunications system (e.g., an RF communication system) and a second type of telecommunications service (e.g., a fiber optic communication system).

Telecommunications boxes according to the disclosure may also allow the service provider to be more efficient with human resources by protecting (via access prevention the first (fiber) communication system from untrained/undertrained installation technicians whose job function/task may be related to the second communication system only. Thus, the service provider may have greater labor efficiency, for example, by allowing untrained technicians to work on segregated fiber boxes.

One or more aspects of the present disclosure provide a compartmentalized telecommunication box for housing components for telecommunications systems. The box includes a first housing portion having a back wall and a side wall extending from the back wall, a second housing portion coupled to the first housing portion, the first housing portion and the second housing portion cooperating to define an enclosure having a cavity, and a compartment panel disposed in the cavity and being coupled to the first housing portion, the compartment panel being movable relative to the first housing portion between a closed position and an open position. The second housing portion is movable relative to the first housing portion between an open configuration providing access to the cavity and a closed configuration. The first housing portion and the second housing portion are in the open configuration and the component panel is in the closed position, the component panel divides the cavity into a first compartment configured to house a first telecommunication system component therein and a second compartment configured to house a second telecommunication system component therein, the first compartment being open such that the first telecommunication system component is accessible to the user, and the second compartment being closed to block access to a second telecommunication system component. The first telecommunication component is mounted to and movable with the panel, and the side wall of the first housing portion has at least one aperture configured to accommodate passage of a first cable, which is connected to the first telecommunications system component, from the first compartment to an exterior of the telecommunication box. The panel has an opening at a first end thereof, the first end of the panel being adjacent to the side wall of the first housing portion, the opening being configured to accommodate passage of a second cable, which is connected to the first telecommunication system component and the second telecommunication system component, from the first compartment to the second compartment. When the first housing portion and the second housing portion are in the open configuration and the component panel is in the open position, the second compartment and the second telecommunication system component are accessible to the user. The component panel is configured to be moved between the closed position and the open position while the first cable and the second cable remain connected to the first telecommunication system component and while the second cable remains connected to the second telecommunication system component.

The second telecommunication system component may be different than the first telecommunication system component. The second telecommunication system component may be a fiber optic system component. The first telecommunication system component may be an RF system component. The first housing portion and the second housing portion may both be constructed of weatherproof, durable material, the material being one of plastic and metal. The first housing portion or the second housing portion is configured to be attached or mounted to a utility pole and/or a residential or commercial building.

The disclosure also shows a compartmentalized box for housing components for telecommunications systems, comprising: a first housing portion; a second housing portion pivotally coupled to the first housing portion, the first housing portion and the second housing portion cooperating to define an enclosure having a cavity, the second housing portion being pivotally movable relative to the first housing portion between an open configuration providing access to the cavity and a closed configuration; a first telecommunications system component mounted to the first housing portion; a compartment panel disposed in the cavity and being pivotally coupled to the first housing portion, the compartment panel being pivotally movable relative to the first housing portion between a closed position and an open position; and a second telecommunications system component mounted to the compartment panel, the second telecommunications system component being accessible to a user when the first housing portion and the second housing portion are in the open configuration and the compartment panel is in the closed position, wherein when the first housing portion and the second housing portion are in the open configuration and the component panel is in the closed position, the component panel divides the cavity into a first compartment and a second compartment, the first compartment and the second telecommunications system component being accessible to the user and the second compartment being closed to block access to the first telecommunications system component, and when the first housing portion and the second housing portion are in the open configuration and the component panel is in the open position, the second compartment and the first telecommunications system component are accessible to the user.

The disclosure also provides an enclosable box for housing components from more than one telecommunication systems, comprising: a first housing portion, a second housing portion, a box mounting hinge that connects the first housing portion and the second housing portion, an internal telecommunication component compartment panel, a compartment panel mounting hinge that connects the internal telecommunication component compartment with one of the first and second housing portions, wherein the box mounting hinge is configured to allow the first housing portion and second housing portion to open and close in a clam like manner, the compartment panel mounting hinge is configured to allow the compartment panel to open and close an internal compartment or cavity that is large enough to enclose at least a first telecommunications systems component.

The upper surface of the compartment panel may be configured to be mounted by a second telecommunication component within the housing. The second telecommunication system may be different than the first telecommunication system. The first telecommunication system component may be a fiber optics telecommunication system component. The second telecommunication system component may be an RF component or coaxial cable component. The outer portion of either the first or second housing portions may be configured to be attached or mounted to a utility pole and/or a residential or commercial building. The enclosable box may further include a second box mounting hinge, and an entry hole is formed in the box between the box mounting hinges that provides enough clearance for cables/cords to be provided to the internal compartment of the box and/or the remaining cavity outside of the internal compartment within the box. The internal compartment panel, when closed, may be configured to provide a secure enclosure to one or more first telecommunication system components within a cavity enclosed by the internal compartment panel, the enclosable box is configured to, when the box and panel are both closed, provide a secure enclosure for housing one or more second telecommunication system components in the remaining cavity space of the box outside of the internal compartment cavity.

In the one or more embodiments, the disclosure also provides a compartmentalized enclosure for controlling access to different components in a telecommunications system comprising: a lower housing member shaped to define an outer perimeter portion and a cavity; a panel member configured to move between a closed panel position, where the panel member prevents access to equipment within the cavity, and an open panel position, where the panel member permits access to the cavity; wherein the panel member is disposed in the cavity of the lower housing member, and is shaped to define a inner perimeter portion that is configured to match and fit within the outer perimeter portion of the lower housing member so as to form a substantially perimeter matching portion that prevents access to equipment within the cavity between the inner perimeter portion and the outer perimeter portion when the panel member is in the closed position. The compartmentalized enclosure may further comprise an upper housing member configured to move between a closed housing position, where the upper housing member prevents access to equipment within the cavity, and an open housing position, where the upper housing member permits access to the cavity.

The compartmentalized enclosure may further comprise wherein the outer perimeter portion has an outer rectangular shape, and the inner perimeter portion has an inner rectangular shape that matches and fits within the outer rectangular shape so as to form a rectangular perimeter matching (or substantially perimeter matching) portion so as to prevent access to equipment within the cavity between the inner perimeter portion and the outer perimeter portion when the panel member is in the closed position. The compartmentalized enclosure may further comprise wherein the segregation panel includes an upper panel portion configured to prevent access to an upper portion of the fiber optical converter when the segregation panel is in the closed position, a sidewall panel portion configured to prevent access to a side portion of the fiber optical converter when the segregation panel is in the closed position, and an extension panel portion configured to prevent access to the fiber optical cable portion when the segregation panel is in the closed position.

The one or more embodiments of the disclosure also include an enclosure for controlling access to a fiber optical cable portion, a fiber optical converter, a coaxial input cable, a cable splitter, and a plurality of output cable portions comprising: a base housing portion having a lower wall portion configured to partially house a first lower portion of a fiber optical cable portion and a second lower portion of a fiber optical converter, a first sidewall portion, a second sidewall portion adjacent to the first sidewall portion, a third sidewall portion adjacent to the first sidewall portion, and a fourth sidewall portion adjacent to the second and third sidewall portions; a segregation panel configured to move between a closed position, where the segregation panel prevents access to the fiber optical converter and prevents access to the fiber optical cable portion, and an open position, where the segregation panel is configured to allow access to the first upper portion of the fiber optical cable portion and allow access to the second upper portion of the fiber optical converter; wherein the segregation panel includes an upper panel portion configured to prevent access to an upper portion of the fiber optical converter when the segregation panel is in the closed position, a sidewall panel portion configured to prevent access to a side portion of the fiber optical converter when the segregation panel is in the closed position, and an extension panel portion configured to prevent access to the fiber optical cable portion when the segregation panel is in the closed position; wherein the upper panel portion of the segregation panel includes a first edge portion configured to fit within the first sidewall portion of the base housing portion so as to prevent access to the upper portion of the fiber optical converter between the first edge portion and the first sidewall portion when the segregation panel is in the closed position; wherein the upper panel portion of the segregation panel includes a second edge portion configured to fit within the second sidewall portion of the base housing portion so as to prevent access to the upper portion of the fiber optical converter between the second edge portion and the second sidewall portion when the segregation panel is in the closed position; wherein the upper panel portion of the segregation panel includes a third edge portion configured to fit within the third sidewall portion of the base housing portion so as to prevent access to the upper portion of the fiber optical converter between the third edge portion and the third sidewall portion when the segregation panel is in the closed position; wherein the sidewall panel portion of the segregation panel includes a lower edge portion configured to fit within the lower wall portion of the base housing portion so as to prevent access to the side portion of the fiber optical converter between the lower edge portion and the lower wall portion of the base housing when the segregation panel is in the closed position; wherein the extension panel portion of the segregation panel includes a first edge panel extension portion that is configured to fit within the fourth sidewall portion of the base housing portion so as to prevent access to the fiber optical cable portion between the first edge panel extension and the fourth sidewall portion when the segregation panel is in the closed position; and wherein the extension panel portion of the segregation panel includes a second edge panel extension portion that is configured to fit within the third sidewall portion of the base housing portion so as to prevent access to the fiber optical cable portion between the second edge panel extension and the third sidewall portion when the segregation panel is in the closed position.

The enclosure may further comprise wherein the fiber optical cable portion, the fiber optical converter, the coaxial input cable, the cable splitter, and the plurality of output cable portions are configured to be connected to one another when the segregation panel is in the closed position. The enclosure may further comprise wherein the segregation panel is configured to allow access to the fiber optical cable portion and the fiber optical converter when the segregation panel is moved to the open position without having to disconnect the fiber optical cable portion, the fiber optical converter, the coaxial input cable, the cable splitter, or the plurality of output cable portions.

The enclosure may further comprise wherein the segregation panel is configured to allow access to the fiber optical cable portion and the fiber optical converter when the segregation panel is moved to the open position without having to disconnect any one of the fiber optical cable portion, the fiber optical converter, the coaxial input cable, the cable splitter, or the plurality of output cable portions. The enclosure may further comprise wherein the segregation panel includes an upper surface configured to be mounted to the cable splitter.

The enclosure may further comprise a base panel configured to encircle a plurality of fiber optical cable portions around the fiber optical converter when the segregation panel is in the open and closed positions. The enclosure may further comprise wherein the base panel is configured to create a peripheral channel around the fiber optical converter so as to maintain a minimum permissible bend radius of the plurality of fiber optical cable portions when the segregation panel is in the open and closed positions. The enclosure may further comprise a base panel configured to maintain a minimum permissible bend radius of a plurality of fiber optical cable portions arranged around the fiber optical converter when the segregation panel is in the open and closed positions. The enclosure may further comprise wherein the base panel is configured to be coupled to the segregation panel.

The one or more embodiments may also include an enclosure for controlling access to a fiber optical cable portion, a fiber optical converter, a coaxial input cable, a cable splitter, and a plurality of output cable portions comprising: a base housing portion having a lower wall portion configured to partially house a first lower portion of a fiber optical cable portion and a second lower portion of a fiber optical converter, a first sidewall portion, a second sidewall portion adjacent to the first sidewall portion, a third sidewall portion adjacent to the first sidewall portion, and a fourth sidewall portion adjacent to the second and third sidewall portions; a segregation panel configured to move between a closed position, where the segregation panel prevents access to the fiber optical converter and prevents access to the fiber optical cable portion, and an open position, where the segregation panel is configured to allow access to the first upper portion of the fiber optical cable portion and allow access to the second upper portion of the fiber optical converter; wherein the segregation panel includes an upper panel portion configured to prevent access to an upper portion of the fiber optical converter when the segregation panel is the closed position, a sidewall panel portion extending from the upper panel portion and configured to prevent access to a side portion of the fiber optical converter when the segregation panel is the closed position, and an extension panel portion extending from the upper panel portion and configured to prevent access to the fiber optical cable portion when the segregation panel is the closed position; and wherein the upper panel portion of the segregation panel includes a first edge portion configured to fit within the first sidewall portion of the base housing portion so as to prevent access to the upper portion of the fiber optical converter between the first edge portion and the first sidewall portion when the segregation panel is in the closed position.

The enclosure may further comprise wherein the upper panel portion of the segregation panel includes a second edge portion configured to fit within the second sidewall portion of the base housing portion so as to prevent access to the upper portion of the fiber optical converter between the second edge portion and the second sidewall portion when the segregation panel is in the closed position. The enclosure may further comprise wherein the upper panel portion of the segregation panel includes a third edge portion configured to fit within the third sidewall portion of the base housing portion so as to prevent access to the upper portion of the fiber optical converter between the third edge portion and the third sidewall portion when the segregation panel is in the closed position.

The enclosure may further comprise wherein the sidewall panel portion of the segregation panel includes a lower edge portion configured to fit within the lower wall portion of the base housing portion so as to prevent access to the side portion of the fiber optical converter between the lower edge portion and the lower wall portion of the base housing when the segregation panel is in the closed position. The enclosure may further comprise wherein the extension panel portion of the segregation panel includes a first edge panel extension portion that is configured to fit within the fourth sidewall portion of the base housing portion so as to prevent access to the fiber optical cable portion between the first edge panel extension and the fourth sidewall portion when the segregation panel is in the closed position.

The enclosure may further comprise wherein the extension panel portion of the segregation panel includes a second edge panel extension portion that is configured to fit within the third sidewall portion of the base housing portion so as to prevent access to the fiber optical cable portion between the second edge panel extension and the third sidewall portion when the segregation panel is in the closed position. The enclosure may further comprise wherein the fiber optical cable portion, the fiber optical converter, the coaxial input cable, the cable splitter, and the plurality of output cable portions are configured to be connected to one another when the segregation panel is in the closed position.

The enclosure may further comprise wherein the segregation panel is configured to allow access to the fiber optical cable portion and the fiber optical converter when the segregation panel is moved to the open position without having to disconnect the fiber optical cable portion, the fiber optical converter, the coaxial input cable, the cable splitter, or the plurality of output cable portions. The enclosure may further comprise wherein the segregation panel is configured to allow access to the fiber optical cable portion and the fiber optical converter when the segregation panel is moved to the open position without having to disconnect any one of the fiber optical cable portion, the fiber optical converter, the coaxial input cable, the cable splitter, or the plurality of output cable portions.

The enclosure may further comprise wherein the segregation panel includes an upper surface configured to be mounted to the cable splitter. The enclosure may further comprise a base panel configured to encircle a plurality of fiber optical cable portions around the fiber optical converter when the segregation panel is in the open and closed positions. The enclosure may further comprise wherein the base panel is configured to create a peripheral channel around the fiber optical converter so as to maintain a minimum permissible bend radius of the plurality of fiber optical cable portions when the segregation panel is in the open and closed positions.

The enclosure may further comprise a base panel configured to maintain a minimum permissible bend radius of a plurality of fiber optical cable portions arranged around the fiber optical converter when the segregation panel is in the open and closed positions. The enclosure may further comprise wherein the base panel is configured to be coupled to the segregation panel.

The one or more embodiments of the disclosure may also provide an enclosure for controlling access to a fiber optical component nested below a coaxial cable component comprising: a base housing portion configured to at least partially house a fiber optical component, the base housing portion having a base wall portion, a first side wall portion, and a second side wall portion; a segregation panel configured to move between a closed position, where the segregation panel prevents access to the fiber optical component and where the fiber optical component is nested below a coaxial cable component, and an open position, where the segregation panel is configured to allow access to the fiber optical component; wherein the segregation panel includes an upper panel edge portion configured to prevent access to the fiber optical component between the upper panel edge portion and the first side wall portion of the base housing portion when the segregation panel is the closed position, and an extension panel edge portion configured to prevent access to the fiber optical component between the extension panel edge portion and the second side wall portion of the base housing portion when the segregation panel is the closed position. The enclosure may further comprise wherein the upper panel portion of the segregation panel includes a first edge portion configured to fit within the first sidewall portion of the base housing portion so as to prevent access to the upper portion of the fiber optical component between the first edge portion and the first sidewall portion when the segregation panel is in the closed position. The enclosure may further comprise wherein the upper panel portion of the segregation panel includes a second edge portion configured to fit within the second sidewall portion of the base housing portion so as to prevent access to the upper portion of the fiber optical component between the second edge portion and the second sidewall portion when the segregation panel is in the closed position. The enclosure may further comprise wherein the upper panel portion of the segregation panel includes a third edge portion configured to fit within the third sidewall portion of the base housing portion so as to prevent access to the upper portion of the fiber optical component between the third edge portion and the third sidewall portion when the segregation panel is in the closed position.

The enclosure may further comprise wherein the sidewall panel portion of the segregation panel includes a lower edge portion configured to fit within the lower wall portion of the base housing portion so as to prevent access to the side portion of the fiber optical component between the lower edge portion and the lower wall portion of the base housing when the segregation panel is in the closed position. The enclosure may further comprise wherein the extension panel portion of the segregation panel includes a first edge panel extension portion that is configured to fit within the fourth sidewall portion of the base housing portion so as to prevent access to the fiber optical cable portion between the first edge panel extension and the fourth sidewall portion when the segregation panel is in the closed position. The enclosure may further comprise wherein the extension panel portion of the segregation panel includes a second edge panel extension portion that is configured to fit within the third sidewall portion of the base housing portion so as to prevent access to the fiber optical cable portion between the second edge panel extension and the third sidewall portion when the segregation panel is in the closed position.

The enclosure may further comprise wherein the fiber optical component comprises a fiber optical converter connected to a fiber optical cable portion when the segregation panel is in the closed position, and the coaxial cable component comprises a cable splitter connected to a coaxial input cable extending from the fiber optical converter and connected to a plurality of output cable portions when the segregation panel is in the closed position, and the segregation panel is configured to allow access to the fiber optical cable portion and the fiber optical converter when the segregation panel is in the open position without having to disconnect the fiber optical cable portion, the fiber optical converter, the coaxial input cable, the cable splitter, or the plurality of output cable portions. The enclosure may further comprise wherein the fiber optical component and the coaxial cable component are connected together when the segregation panel is in the closed position, and the segregation panel is configured to allow access to the fiber optical cable portion and the fiber optical converter when the segregation panel is in the open position without having to disconnect the fiber optical component and the coaxial cable component from one another.

The enclosure may further comprise wherein the coaxial cable component comprises a splitter and the segregation panel includes an upper surface configured to be mounted to the splitter. The enclosure may further comprise wherein the coaxial cable component comprises a splitter, the fiber optical component comprises a converter, and the segregation panel includes an upper surface configured to be mounted to the splitter so as to physically segregate the splitter from the converter, allow access to the splitter when the segregation panel is in the open and closed position, permit access to the converter when the segregation panel is in the closed position, allow access to the converter when the segregation panel is in the open position.

The enclosure may further comprise a base panel configured to encircle a plurality of fiber optical cable portions around the fiber optical converter when the segregation panel is in the open and closed positions. The enclosure may further comprise wherein the base panel is configured to create a peripheral channel around the fiber optical converter so as to maintain a minimum permissible bend radius of the plurality of fiber optical cable portions when the segregation panel is in the open and closed positions.

The enclosure may further comprise a base panel configured to maintain a minimum permissible bend radius of a plurality of fiber optical cable portions arranged around the fiber optical converter when the segregation panel is in the open and closed positions. The enclosure may further comprise wherein the base panel is configured to be coupled to the segregation panel such that the segregation panel moves relative to the base panel when the segregation panel moves before the open and closed positions. The enclosure may further comprise a lower panel edge portion configured to prevent access to the fiber optical component between the lower panel edge portion and the base wall portion of the base housing portion when the segregation panel is the closed position. The enclosure may further comprise two mounting hinges provided on a same side of the lower housing member so as to connect the lower housing member with the panel member, wherein an entry hole is formed in between the two mounting hinges and provides clearance for external cables/cords to enter into the enclosure and be provided to an internal compartment and/or a portion of a cavity of the enclosure outside of the internal compartment. The enclosure may further comprise wherein the panel member, when closed, is configured to provide a secure enclosure for housing a first type of telecommunications system component within the internal compartment, and the enclosure is configured to, when the enclosure and the panel member are both closed, provide a secure enclosure for housing a second type of telecommunications system component in the portion of the cavity of the enclosure outside of the internal compartment. The enclosure may further comprise wherein the box hinge side of the lower housing member includes one or more apertures that are configured to feed wires from a second type of telecommunications system component to an exterior of the enclosure, thereby facilitating the persistent connection of the second type of telecommunications system component inside the enclosure regardless of whether the panel is in an open or closed position. The enclosure may further comprise two mounting hinges provided on a same side of the upper and lower housing members so as to connect the upper and lower housing members, wherein an entry hole is formed in the connected upper and lower housing members in between the two mounting hinges and provides clearance for external cables/cords to enter into the enclosure and be provided to an internal compartment and/or a portion of a cavity of the enclosure outside of the internal compartment.

BRIEF DESCRIPTION OF THE DRAWINGS

Exemplary embodiments will be described with reference to the following drawings.

DETAILED DESCRIPTION OF EXEMPLARY EMBODIMENTS

Figure 1:
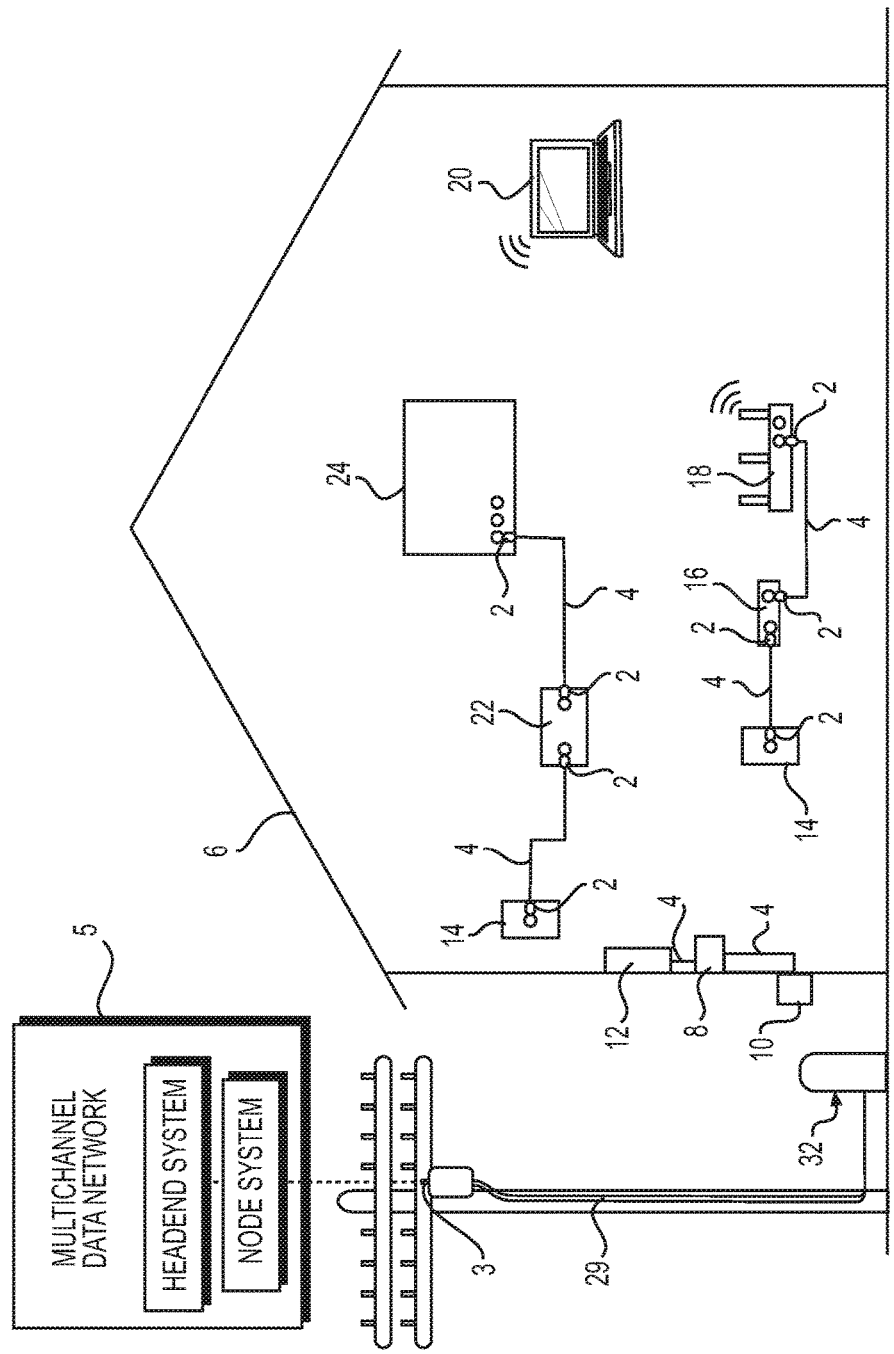
FIG. 1 shows a schematic view of an exemplary network environment in accordance with various aspects of the disclosure.

FIG. 1 shows a schematic view of an exemplary network environment 6 in accordance with various aspects of the disclosure. In particular, cable connectors 2 and 3 may enable the exchange of data signals between a broadband network or multichannel data network 5, and various devices within a home, building, venue or other environment 6. For example, the environment 6 may include the following devices: (a) a point of entry ("PoE") filter 8 operatively coupled to an outdoor cable junction device 10; (b) one or more signal splitters within a service panel 12 which distributes the data service to interface ports 14 of various rooms or parts of the environment 6; (c) a modem 16 which modulates radio frequency ("RF") signals to generate digital signals to operate a wireless router 18; (d) an Internet accessible device, such as a mobile phone or computer 20, wirelessly coupled to the wireless router 18; and (e) a set-top unit 22 coupled to a television ("TV") 24. In one embodiment, the set-top unit 22, typically supplied by the data provider (e.g., the cable TV company), may include a TV tuner and a digital adapter for High Definition TV.

In some embodiments, the multichannel data network 5 may include a telecommunications, cable/satellite TV ("CATV") network operable to process and distribute different RF signals or channels of signals for a variety of services, including, but not limited to, TV, Internet and voice communication by phone. For TV service, each unique radio frequency or channel is associated with a different TV channel. The set-top unit 22 converts the radio frequencies to a digital format for delivery to the TV. Through the data network 5, the service provider can distribute a variety of types of data, including, but not limited to, TV programs including on-demand videos, Internet service including wireless or WiFi Internet service, voice data distributed through digital phone service or Voice Over Internet Protocol ("VoIP") phone service, Internet Protocol TV ("IPTV") data streams, multimedia content, audio data, music, radio and other types of data/data services.

In some embodiments, the multichannel data network 5 is operatively coupled to a multimedia home entertainment network serving the environment 6. In one example, such multimedia home entertainment network is the Multimedia over Coax Alliance ("MoCA") network. The MoCA network increases the freedom of access to the data network 5 at various rooms and locations within the environment 6. The MoCA network, in one embodiment, operates on cables 4 within the environment 6 at frequencies in the range of 1125 MHz to 1675 MHz. MoCA compatible devices can form a private network inside the environment 6.

As shown in FIG. 1, coaxial cables 4, 29 may be provided at different locations and may be configured to distribute the data to the environment 6 via connectors 2 attached to the coaxial cables 4. The cables 4, through use of the connectors 2, are connectable to various communication interfaces within the environment 6, such as the female interface port 14 illustrated in FIG. 2. In the examples shown, female interface ports 14 are incorporated into: (a) a signal splitter within an outdoor cable service or distribution box 32 which distributes data service to multiple homes or environments 6 close to each other; (b) a signal splitter within the outdoor cable junction box or cable junction device 10 which distributes the data service into the environment 6; (c) the set-top unit 22; (d) the TV 24; (e) wall-mounted jacks, such as a wall plate; and (f) the router 18.

Figure 2:
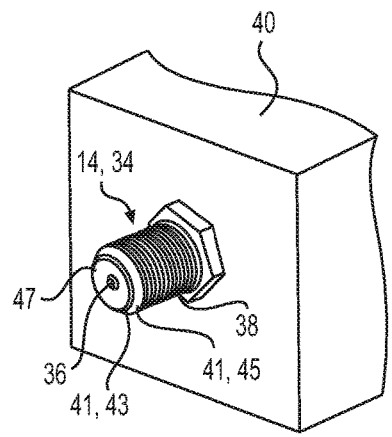
FIG. 2 shows a perspective view of an exemplary interface port in accordance with various aspects of the disclosure.

In one embodiment, each of the female interface ports 14 includes a stud or jack, such as the cylindrical stud 34 illustrated in FIG. 2. The stud 34 may have: (a) an inner, cylindrical wall 36 defining a central hole configured to receive an electrical contact, wire, pin, conductor (not shown) positioned within the central hole; (b) a conductive, threaded outer surface 38; (c) a conical conductive region 41 having conductive contact sections 43 and 45; and (d) a dielectric or insulation material 47.

In some embodiments, stud 34 is shaped and sized to be compatible with the F-type coaxial connection standard. It should be understood that, depending upon the embodiment, stud 34 could have a smooth outer surface. The stud 34 can be operatively coupled to, or incorporated into, a device 40 which can include, for example, a cable splitter of a distribution box 32, outdoor cable junction box 10 or service panel 12; a set-top unit 22; a TV 24; a wall plate; a modem 16; a router 18; or the junction device 33.

During installation, the installer (installing technician) may couple a cable 4 to an interface port 14 by screwing or pushing the connector 2 onto the female interface port 34. Once installed, the connector 2 receives the female interface port 34. The connector 2 establishes an electrical connection between the cable 4 and the electrical contact of the female interface port 34.

The coaxial cable 4 may extend along a cable axis or a longitudinal axis. In one embodiment, the cable 4 includes: (a) an elongated center conductor or inner conductor 44; (b) an elongated insulator 46 coaxially surrounding the inner conductor 44; (c) an elongated, conductive foil layer 48 coaxially surrounding the insulator 46; (d) an elongated outer conductor 50 coaxially surrounding the foil layer 48; and (e) an elongated sheath, sleeve or jacket 52 coaxially surrounding the outer conductor 50.

The inner conductor 44 is operable to carry data signals to and from the data network 5. Depending upon the embodiment, the inner conductor 44 can be a strand, a solid wire or a hollow, tubular wire. The inner conductor 44 is, in one embodiment, constructed of a conductive material suitable for data transmission, such as a metal or alloy including copper, including, but not limited, to copper-clad aluminum ("CCA"), copper-clad steel ("CCS") or silver-coated copper-clad steel ("SCCCS").

The insulator 46, in some embodiments, is a dielectric having a tubular shape. In one embodiment, the insulator 46 is radially compressible along a radius or radial line 54, and the insulator 46 is axially flexible along the longitudinal axis 42. Depending upon the embodiment, the insulator 46 can be a suitable polymer, such as polyethylene ("PE") or a fluoropolymer, in solid or foam form.

Figure 3:
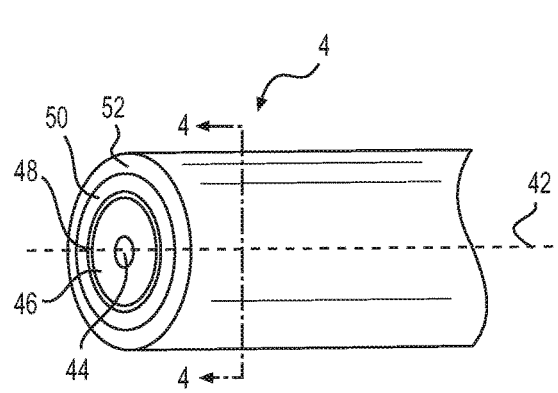
FIG. 3 shows a perspective view of an exemplary coaxial cable in accordance with various aspects of the disclosure.
Figure 4:
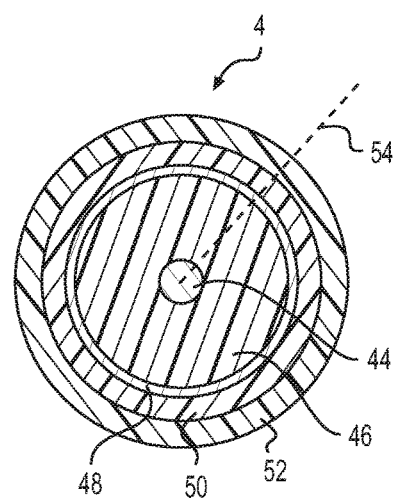
FIG. 4 shows a cross-sectional view of the exemplary coaxial cable of FIG. 3.

In the embodiment illustrated in FIGS. 3 and 4 (cross-sectional view), the outer conductor 50 includes a conductive RF shield or electromagnetic radiation shield. In such embodiment, the outer conductor 50 includes a conductive screen, mesh or braid or otherwise has a perforated configuration defining a matrix, grid or array of openings. In one such embodiment, the braided outer conductor 50 has an aluminum material or a suitable combination of aluminum and polyester. Depending upon the embodiment, cable 4 can include multiple, overlapping layers of braided outer conductors 50, such as a dual-shield configuration, tri-shield configuration or quad-shield configuration.

In one embodiment, the connector 2 electrically grounds the outer conductor 50 of the coaxial cable 4. The conductive foil layer 48, in one embodiment, is an additional, tubular conductor which provides additional shielding of the magnetic fields. In one embodiment, the jacket 52 has a protective characteristic, guarding the cable's internal components from damage. The jacket 52 also has an electrical insulation characteristic.

Figure 5:
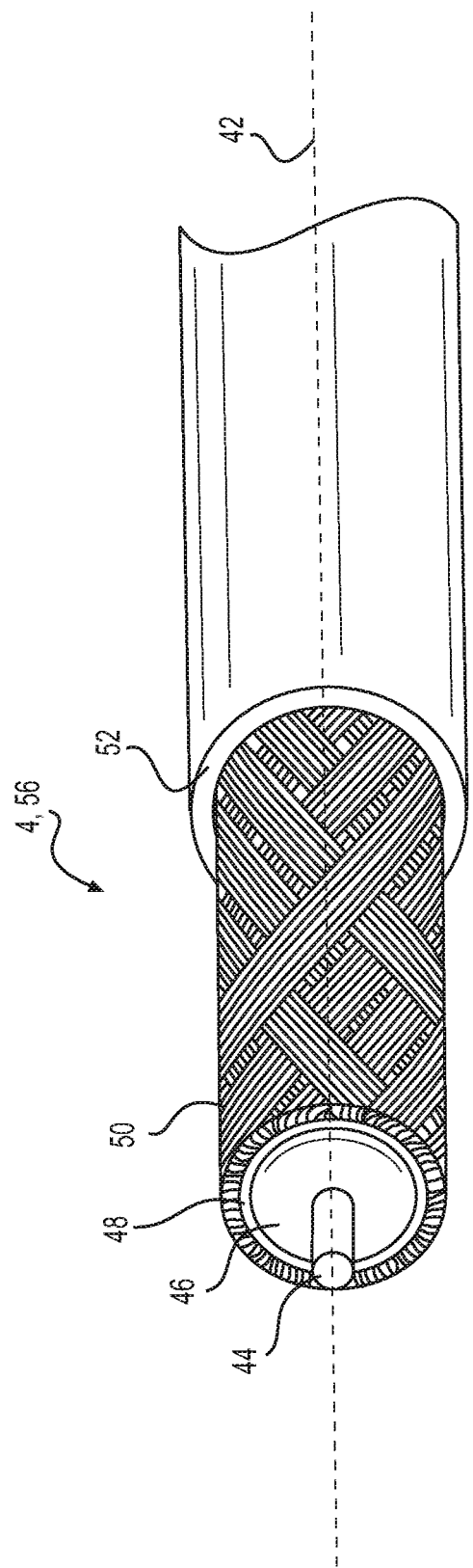
FIG. 5 shows a perspective view of an exemplary prepared end of the exemplary coaxial cable of FIG. 3.

As shown in FIG. 5, during installation, an installer or preparer may prepare a terminal end 56 of the cable 4 so that it can be mechanically connected to the connector 2. To do so, the preparer removes or strips away differently sized portions of the jacket 52, outer conductor 50, foil 48 and insulator 46 so as to expose the side walls of the jacket 52, outer conductor 50, foil layer 48 and insulator 46 in a stepped or staggered fashion. In the example shown in FIG. 5, the prepared end 56 has a two step-shaped configuration. At this point, the cable 4 is ready to be connected to the connector 2. In some embodiments, the prepared end has a three step-shaped configuration (not shown), where the insulator 46 extends beyond an end of the foil 48 and outer conductor 50.

Depending upon the embodiment, the components of the cable 4 can be constructed of various materials which have some degree of elasticity or flexibility. The elasticity enables the cable 4 to flex or bend in accordance with broadband communications standards, installation methods or installation equipment. Also, the radial thicknesses of the cable 4, the inner conductor 44, the insulator 46, the conductive foil layer 48, the outer conductor 50 and the jacket 52 can vary based upon parameters corresponding to broadband communication standards or installation equipment.

Figure 6:
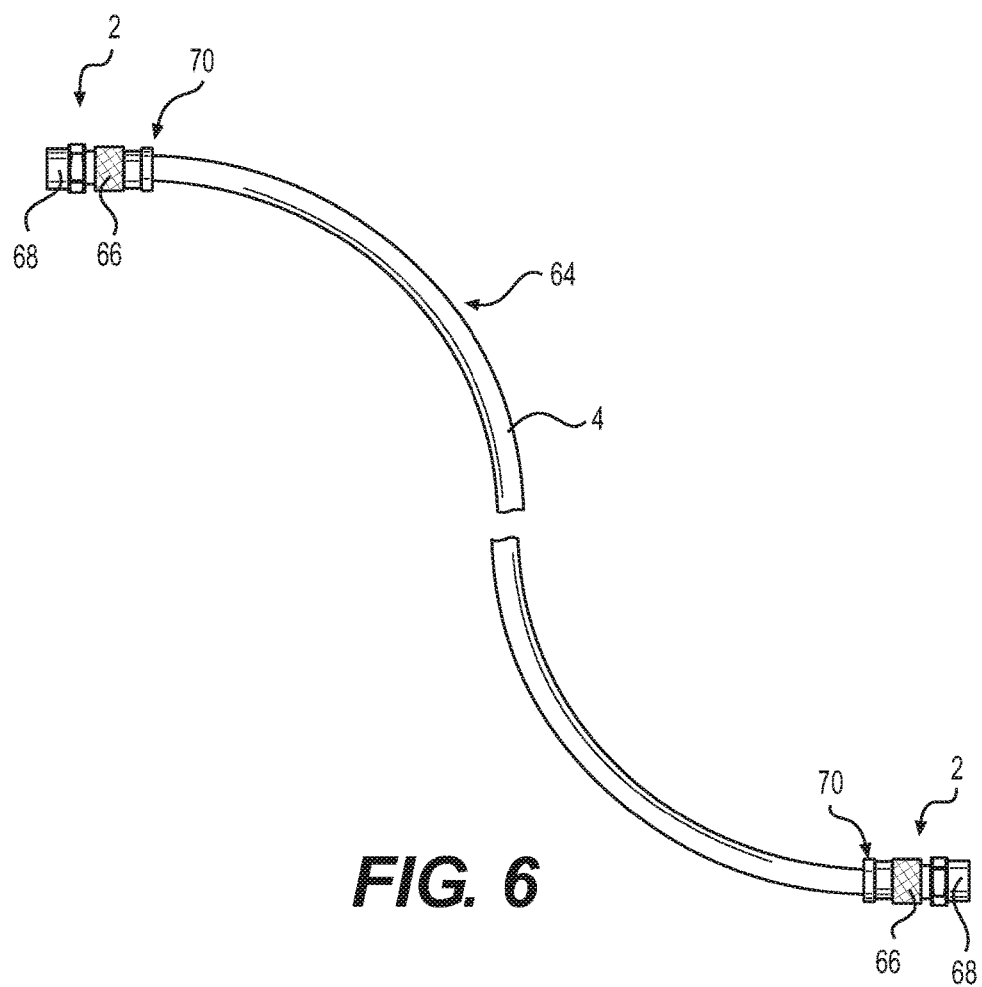
FIG. 6 shows a top view of one embodiment of a coaxial cable jumper or cable assembly which is configured to be operatively coupled to a multichannel data network.

In one embodiment illustrated in FIG. 6, a cable jumper or cable assembly 64 includes a combination of the connector 2 and the cable 4 attached to the connector 2. In this embodiment, the connector 2 includes a connector body or connector housing 66 and a fastener or coupler 68, such as a threaded nut, which is rotatably coupled to the connector housing 66. The cable assembly 64 has, in one embodiment, connectors 2 on both of its ends 70. In some embodiments, the cable assembly 64 may have a connector 2 on one end and either no connector or a different connector at the other end. Preassembled cable jumpers or cable assemblies 64 can facilitate the installation of cables 4 for various purposes.

The cable 4 may be a weatherized coaxial cable 29 that has the same structure, configuration and components as coaxial cable 4 except that the weatherized coaxial cable includes additional weather protective and durability enhancement characteristics. These characteristics enable the weatherized coaxial cable to withstand greater forces and degradation factors caused by outdoor exposure to weather.

During installation the installation technician may perform a folding process to prepare the cable 4 for connection to connector 2. The preparer may fold the braided outer conductor 50 folded backward onto the jacket 52. As a result, the folded section 60 may be oriented inside out. The bend or fold 62 may be adjacent to the foil layer 48 as shown. Certain embodiments of the connector 2 include a tubular post. In such embodiments, this folding process can facilitate the insertion of such post in between the braided outer conductor 50 and the foil layer 4

Depending upon the embodiment, the components of the cable 4 can be constructed of various materials which have some degree of elasticity or flexibility, which enables the cable 4 to flex or bend in accordance with broadband communications standards, installation methods or installation equipment. Further, the radial thicknesses of the cable 4, the inner conductor 44, the insulator 46, the conductive foil layer 48, the outer conductor 50 and the jacket 52 can vary based upon parameters corresponding to broadband communication standards or installation equipment.

FIGS. 7-11 illustrate a first embodiment of a universal multi-purpose compartmentalized telecommunication box 100 (or "entry box," "house box," or "fiber box") in accordance with various aspects of the disclosure. In particular, FIGS. 7-11 show the parts of an embodiment of the telecommunication box 100 that may be configured to house multiple types of telecommunication system components, for example, fiber optic system components and RF system components. The telecommunications box 100 may comprise a housing including a first housing portion 102 and a second housing portion 104, that are permanently (or semi-permanently) pivotally joined together at corresponding first edges 102A, 104A allowing the box to pivotally open and close. For example, the first and second housing portions 102, 104 may be joined together by a box mounting hinge 100A that is configured to allow the first and second housing portions to pivotally open, such as, by a force that causes opposite corresponding second edges 102B, 104B of the first and second housing portions 102, 104 to move in opposite directions. The first and/or second housing portions 102, 104 may form an internal box cavity 106. As shown in the embodiments disclosed herein, a larger portion of the cavity 106 may be located in first housing portion 102 than in the second housing portion 104. It should be appreciated that the cavity 106 may be split between the first and second housing portions 102, 104 and/or modified as desired. When the telecommunication box 100 is closed, the box 100 forms an enclosure that can provide protection from weather, fire, and/or theft of two or more telecommunications installation systems (and their respective installation components).

Figure 7:
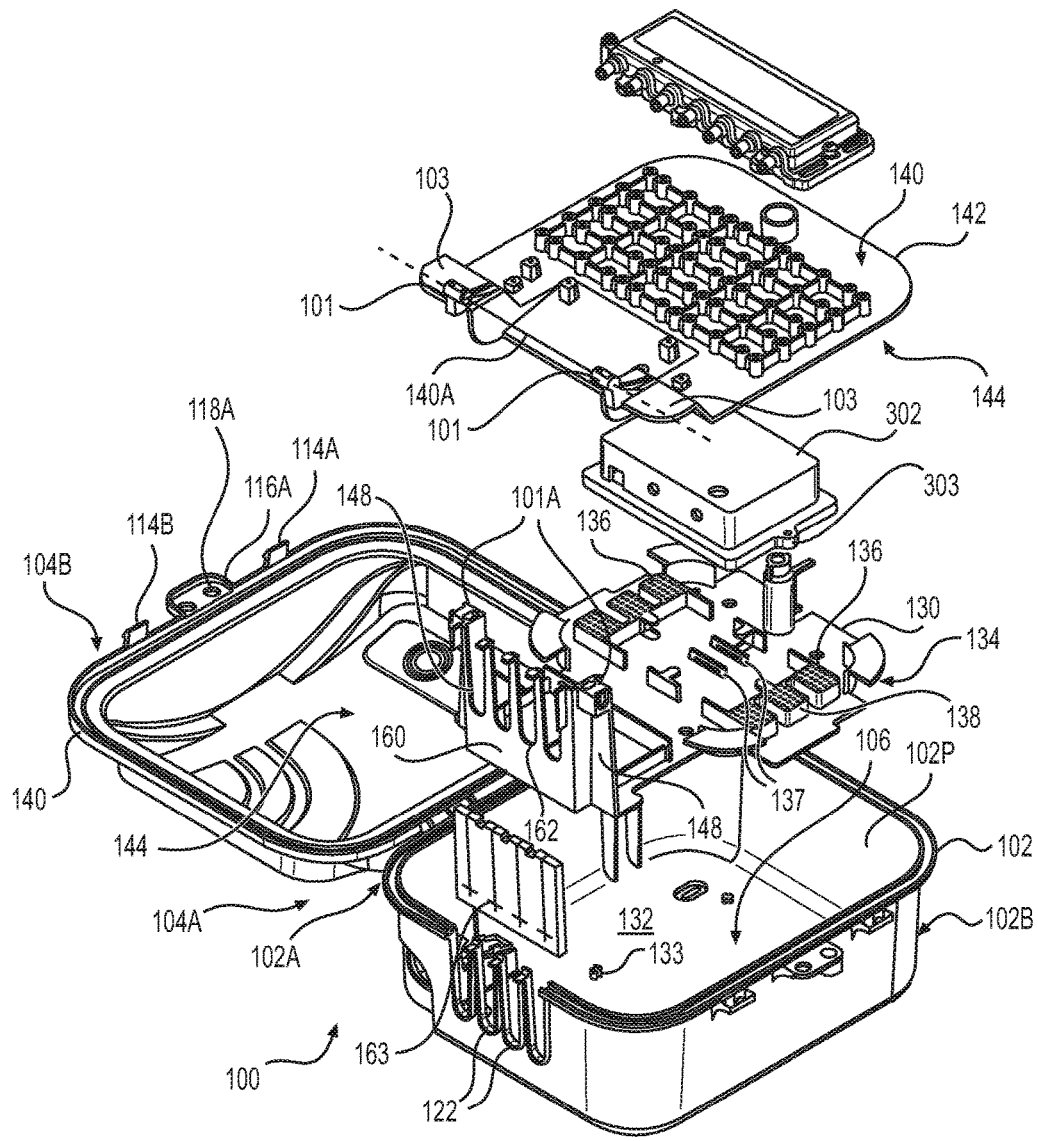
FIG. 7 shows an exploded view of a first embodiment of an exemplary telecommunication box in accordance with various aspects of the disclosure.
Figure 8:
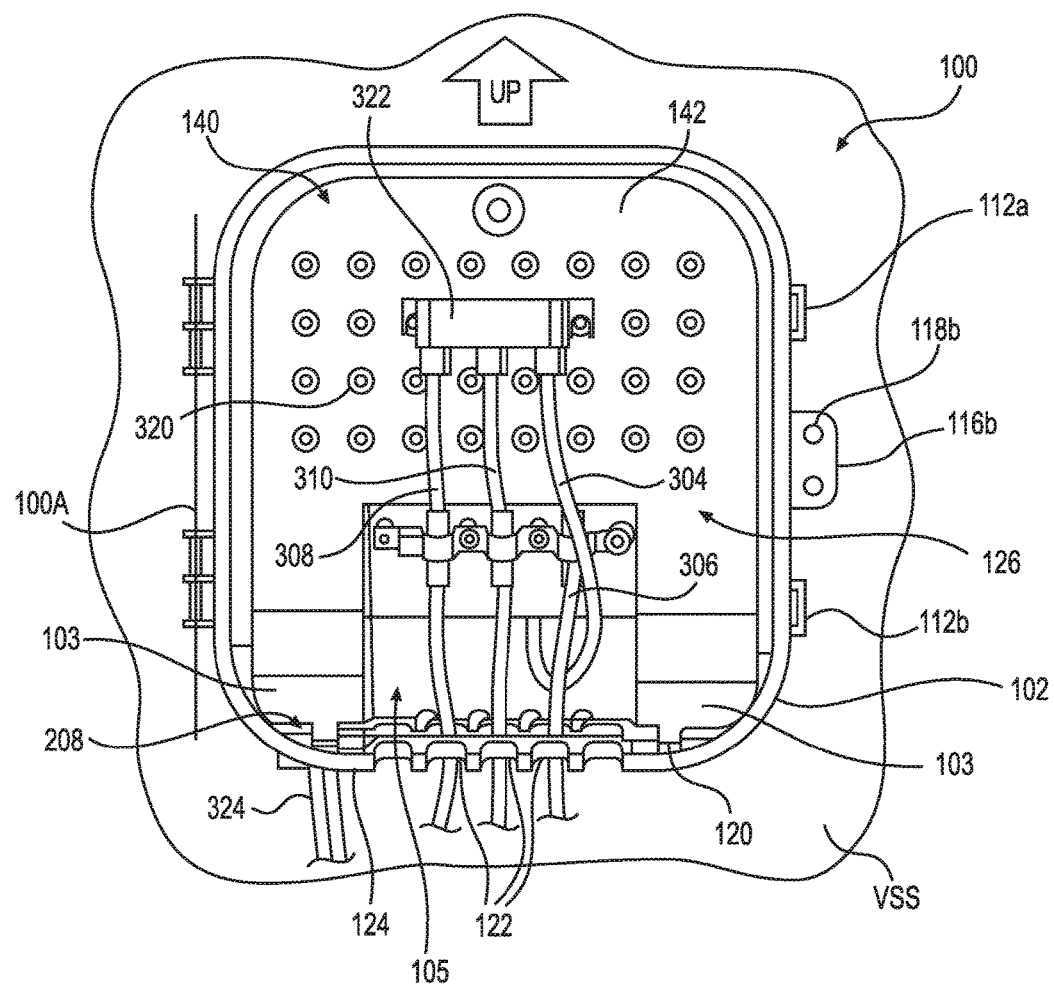
FIG. 8 shows a front view of the first embodiment of the exemplary telecommunication box with a segregating or hidden compartment panel in a closed position.
Figure 9:
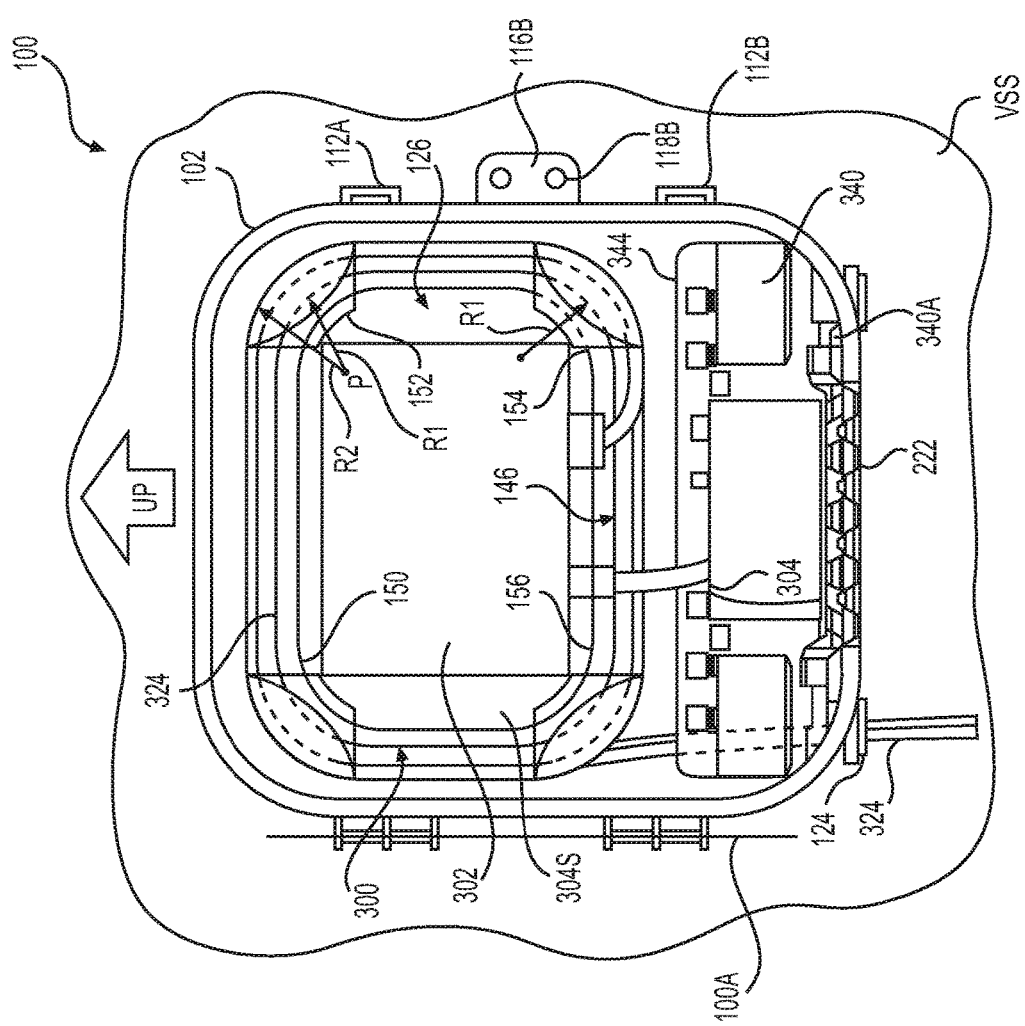
FIG. 9 shows a front view of the first embodiment of the exemplary telecommunication box with the segregating or hidden compartment panel in an open position.
Figure 10:
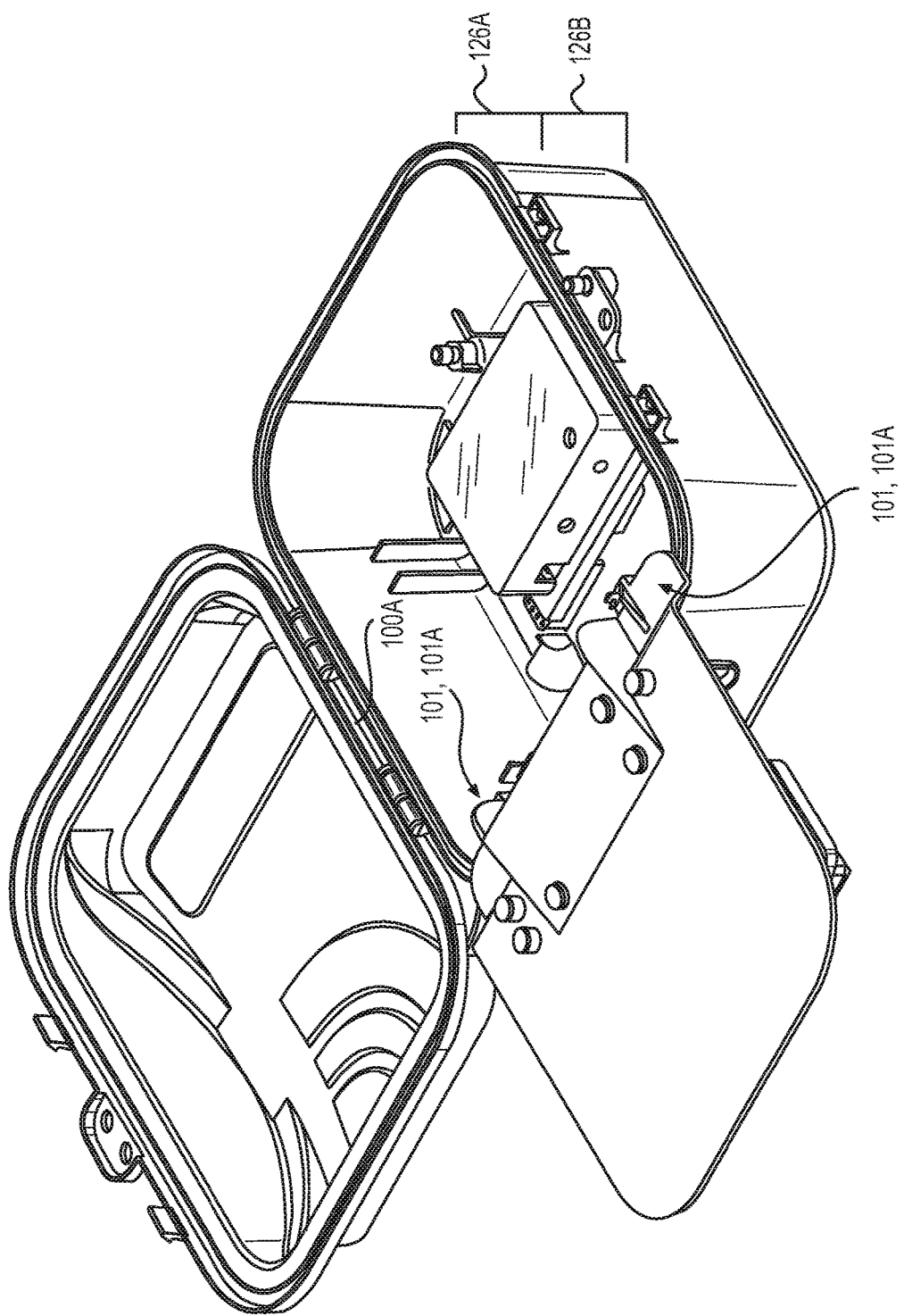
FIG. 10 shows a perspective view of the first embodiment of the exemplary telecommunication box with a segregating or hidden compartment panel in an open position and with components not yet installed.
Figure 11:
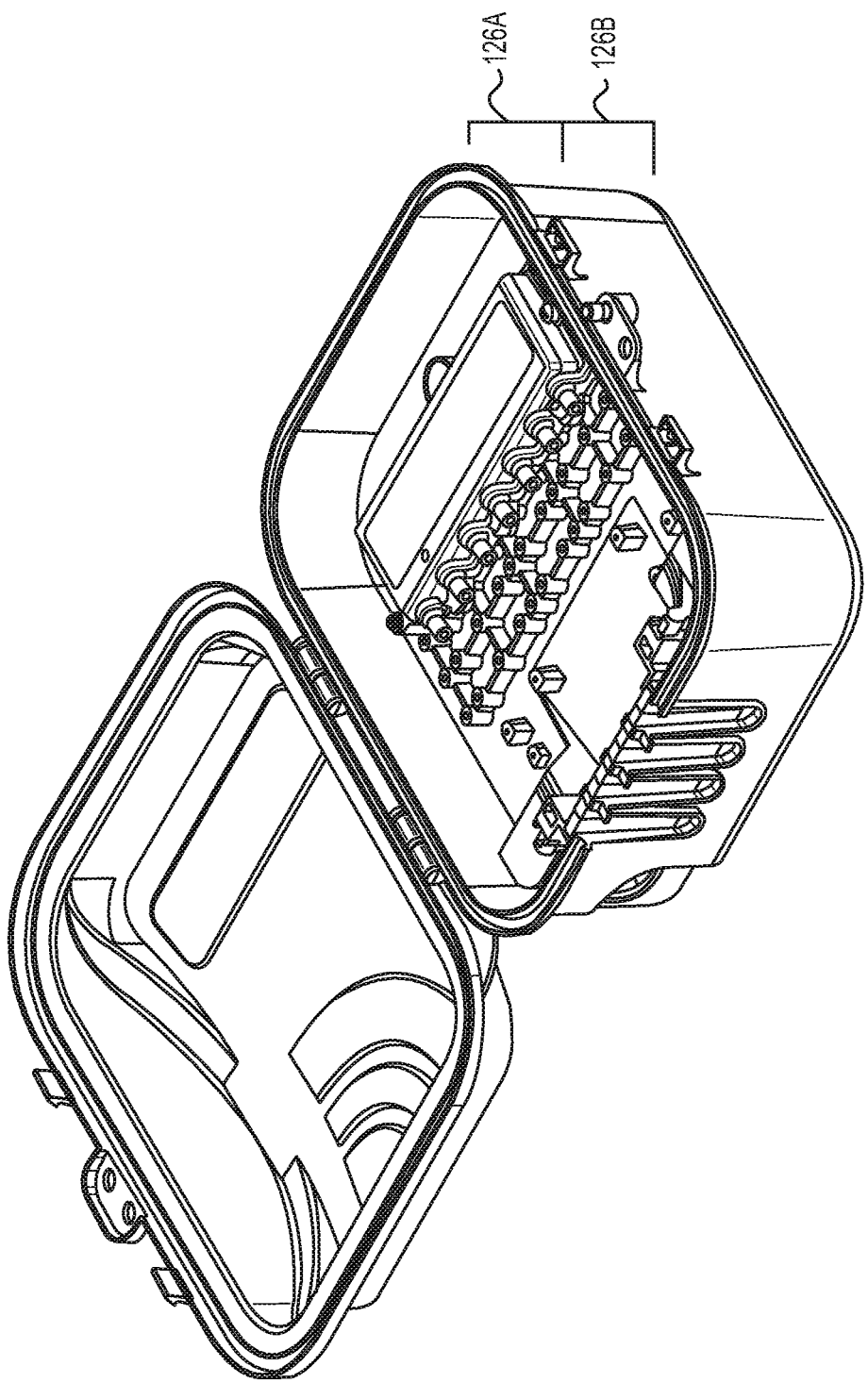
FIG. 11 shows a perspective view of the first embodiment of the exemplary telecommunication box with a segregating or hidden compartment panel in a closed position and with components not yet installed.

As shown in FIGS. 7-9, the hinge axis 100A is vertical when the telecommunication box 100 is mounted to a vertical support structure VSS disposed in the direction of the arrow labeled "UP." The secure enclosure 100 may be detachably joined along the opposite edge or side by locking tabs to facilitate opening/closing of secure enclosure 100. For example, the locking tabs 110 (FIG. 8) may include a molded U-shaped opening 112a, 112b in one of the first and second housing portions 102, 104 and corresponding resilient clasps 114a, 114b integrally formed in the other of the first and second housing portions 102, 104. The locking tabs 110 may be augmented by fittings 116a, 116b having aligned apertures 118a, 118b for accepting a lock and key to secure the telecommunication box 100 in a closed position.

Referring to FIGS. 7-9, the cavity 106 of the first and second housing portions 102, 104 may be configured to contain or house first and second telecommunication systems 300, 320 each including at least one telecommunication system component. In the described embodiment, the first telecommunication system is a fiber optic system 300 and includes a fiber optic converter 302 operative to convert an optic signal received along a fiber optic cable 324 into a digital signal to be transmitted along a coaxial cable 304 to the second telecommunication system 320. The second telecommunication system 320 is a coaxial cable system and includes a cable splitter 322 operative to split a signal entering via the input cable 304 into multiple signals exiting the box 100 along output cables 306, 308, 310. Each of the telecommunication systems 300, 320 relies on inherently different underlying technology for its operation. Fiber optic cables rely on optics or light for data transmission while coaxial cable relies on the precise spacing between inner and outer conductors to efficiently transmit signals in the radio frequency band or spectrum.

The first housing portion 102 of the box 100 has a first (bottom) wall 120 having an opening 124 for receiving the fiber optic cable 324 that directs an optic signal to the fiber optic telecommunication system component 300. The first wall 120 also includes apertures 122 through which a fiber optic or coaxial cable may be fed. The apertures 122 may be elongated in the plane of the first wall 120 so that different diameter cables or a plurality of cables can be accommodated by the apertures 122. The apertures 122 may employ a simple gasket (not shown) through which a fiber optic or coaxial cable is fed, or a bulkhead connection (also not shown). In the described embodiment, the apertures 122 are disposed in the bottom wall 120 such that the cables 306, 308, 310 and 324 enter/exit vertically through the apertures 122. Furthermore, the downward orientation minimizes the number and severity of cable bends, as will be discussed in more detail below.

Referring to FIG. 7, the telecommunication box 100 includes a base plate 130 and a pivoting panel or deck 140. The base plate 130 is configured to be fixedly coupled with a back wall 132 of the box 100. For example, the back wall 132 may include projections 133 that can be snap fit into corresponding recesses (not shown) in a back surface of the base plate 130, as would be understood by persons skilled in the art. The panel or deck 140 also may snap into the base plate 130 along the horizontal pivot axis 140A, thereby base plate 130 defines this independent structure having one surface for mounting the optical component (ONU) regardless of what kind of box having going on around them.

In this embodiment, the bottom base plate 130 could have an ONU attached to it. The curved corner prevents the fiber from bending by looping the edge so fiber around and around there. In other words, the base plate 130 could be snapable or attachable to the bottom of the box, and allow the panel 140 to pivot by the pivot joints (cam receiving portions 101A) so as to open and close to permit access to the equipment (the ONU).

Alternatively or additionally, the base plate 130 can be coupled with the back wall 132 of the box 100 by screws, bolts, or the like. Further, when the telecommunication box 100 is attached to the vertical support structure VSS, fasteners (not shown) that attach the box 100 to the VSS may extend through the base plate 130 and the back wall 132 of the box, thereby further securing the base plate 130 to the back wall 132.

However, the house box is not limited to separate parts. In another embodiment, the features of the base plate (e.g., the mounting platforms 136, etc.) could instead be made out of an existing structure (e.g., machined into the back of the box so that no base plate is necessary, but the features of the base plate are still provided). For example, FIG. 12 (discussed more below) shows a "no base plate" example where the base plate components discussed below are all hinged directly to the box. However, having too many features machined into the back could be too complicated.

The base plate 130 includes a first portion 134 configured to mount the fiber optic converter 302. For example, the first portion 134 includes a plurality of raised mounting platforms 136 that are structured and arranged to universally accommodate most commercially available fiber optic converters 302. For example, fiber optic converters 302 conventionally include mounting tabs 303 arranged at opposite sides, diagonal corner, four corners, etc. Each of the raised mounting platforms 136 has a plurality of preformed holes 138 configured to receive screws (not shown) conventionally used to mount a fiber optic converter 302 to a mounting box. The number and spacing of the holes 138 provides a universal mounting system for most conventional fiber optic converters.

When the fiber optic converter 302 is mounted to the base plate 130, the raised mounting platforms 136 maintain the fiber optic converter 302 spaced from a surface of the base plate 130, which assists with passive cooling of the converter 302. Further, the platforms 136 are spaced from one another to provide adequate space to accommodate a fiber optic splice (not shown), as well as an amount of slack of bare optic fiber. The base plate 130 may include a pair of parallel raised projections 137 that each include a slot configured to receive a conventional fiber optic splice member (not shown). As can be seen, in FIG. 8, the house box of FIG. 7 is in a closed state/position, which is a state in which a component for a second telecommunications system may be installed while access is prevented/restricted to the component of the first telecommunication system 302 (hidden in FIG. 8). The access prevention does not have to be full perimeter matching lids (i.e., airtight perimeter matching). Instead, the lid panel may fit to the extent that it prevents access to the lower portion of the box. The perimeter matching (or substantially perimeter matching) aspects of the lid panel in FIG. 8, when in the closed state, prevent access to the equipment (ONU) within the cavity. However, there may be some non-perimeter matching portions where the same effect is provided. For example, it may not be air tight, and the configuration may be only substantially perimeter matching so as to prevent from meaningfully interfering with the equipment underneath. For example, substantially perimeter matching could mean prevent within reason in that a screwdriver could be jammed in there, but the access is prevented such that you aren't going to be able to unscrew the connectors.

The base plate 130 includes a plurality of wrap guides 150, 152, 154, 156 that extend in a direction from the back wall 132 of the box 100 toward the second housing portion 104 and cooperate with an inner peripheral surface 102P of the first housing portion 102 to delimit a peripheral channel 146 (FIG. 9). The channel 146 is substantially rectangular in shape and produces a bend radius which is greater than the minimum bend radius of the fiber optic cable 324. In the described embodiment, therefore, the width of the channel 146 is the difference between radii R2 and R1 (depicted in FIG. 9). The radial distance R2 is the distance from a reference point P to the outer surface of one of the wrap guides 150, 152, 154, 156 while the radial distance R1 is the distance from the reference point P to the inner surface of the respective one of the wrap guides 150, 152, 154, 156.

The geometry of the wrap guides 150, 152, 154, 156 causes the fiber optic cable 324 to follow an arcuate path which is greater than or equal to the minimum bend radius of the fiber optic cable 324. The bend radius of the channel 146 in the area of the wrap guides 350, 352, 354, 356 is generally greater than the minimum permissible bend radius of the cable 324 to prevent signal losses. For example, as the bend radius of an optic fiber or filament decreases, the incident light energy is not fully reflected internally of the optic filament. Accordingly, light energy is refracted out of the filament causing a portion of the light energy to be absorbed or lost.

The base plate 130 includes a second portion 144 that extends from the first portion 134 toward the first (bottom) wall 120 of the box 100. The second portion 144 includes a pair of columns 148 (pillar posts) that extend in a direction from the back wall 132 of the first housing portion 102 toward the second housing portion 104. The pillar posts/columns 148 provide the receivers 101A that extend upward. In the configuration of FIG. 7, as an example, the pillar posts/columns 148 are substantially perpendicular relative to the base plate 140.

A wall 160 extends between the columns 148 parallel to and spaced from the first wall 120 of the box 100. The wall 160 includes elongated apertures 162 substantially aligned with the apertures 122 of the first wall 120 of the box 100. A rubber or foam insert 163 may be sandwiched between the wall 160 of the base plate 130 and the first wall 120 of the box 100. The insert 163 includes elongated slits substantially aligned with the apertures 122, 162 to receive telecommunication cables while preventing the infiltration of debris (e.g., leaves, soil, pollen) into the cavity 106 of the box.

The pivoting panel or deck 140 pivotally mounts to the base plate 130 of the housing 100 and segregates the first and second telecommunication systems, i.e., the fiber optic telecommunication system 300 and the coaxial cable telecommunication system 320. More specifically, the panel 140 segregates the system components 302, 322 and the coaxial cables 304, 306, 308, 310 from the fiber optic cable 324.

The segregation panel 140 pivots about a horizontal pivot axis 140A to facilitate maintenance on either side of the panel 140. Furthermore, the pivot axis 140A is offset from the face surface 142 of the panel 140 to allow the input coaxial cable 304 to bend freely from one side 142 to the other side 144 of the segregating panel 140. Further, the offset arrangement allows the signal splitting coaxial cables 306, 308, 310 to remain connected to the system component 322 and exit through the apertures 122, 162 when the segregating panel 140 pivots from a closed to an open position. Furthermore, the wrap guides 150, 152, 154, 156 control the bend radius of slack cables stored in the entry enclosure 100 to prevent damage to, or degradation to the telecommunication system cable 324. The telecommunication box 100 provides a standardized approach to combining the telecommunication system components 302, 322 in a single enclosure, while maintaining a safe and effective approach to handling, maintaining and modifying the system components 302, 322.

In the described embodiment, the panel 140 pivots along a horizontal pivot or hinge axis 140A, which is not coplanar with the panel 140. That is, the horizontal pivot axis 140A is offset from a face surface 142 of the panel 140. Finally, the panel 140 is configured to mount at least one of the telecommunication system components, e.g., a converter 302 and/or a splitter 322, along one side of the panel 140. In the described embodiment, the cable splitter 322 is mounted to the face surface 142 of the panel 340. While, in the illustrated embodiment, the converter 302 is mounted to the back wall 132 of the first housing portion 102, it should be appreciated that in some embodiments the converter 302 may be mounted to a backside, surface 144 of the panel 120.

For example, the pivoting panel 140 may include two protruding cam portions 101 that may be attached to cam receiving portions 101A of the base plate 130 such that the pivoting panel 140 may be pivotally repositioned to open and close the compartment cavity 126 underneath the panel 140. The pivoting panel 140 may a vertically extending wall that provides the pivoting panel 140 with a height such that the pivoting panel 140, when closed (closed meaning that the panel is substantially parallel to the back wall 132 of the first housing portion 102), provides a cavity/compartment 126 large enough to enclose the fiber optic component 302.

The pivoting panel 140 may include raised partial ledges 103 configured with the cam portions 101. The ledges 103 may also be provided such that they are on opposite sides of an opening 105 that allows for cables/cords to enter the cavity 126 on either side of the pivoting panel 140. For example, the pivoting panel 140 splits the cavity 126 into two component compartments 126A and 126B. In FIG. 8, for example, the compartment 126B is hidden (but contains the converter 302), while the upper compartment 126A, which holds the component 322 is accessible. In this configuration, when closed (and/or locked), the second telecommunication system (coaxial system) is accessible, while the first telecommunication system (the fiber system) is hidden and/or protected from disturbance. In some embodiments, instead of the upper compartment 126A having the coaxial, could have an Ethernet router or switch, or optical Ethernet instead of optical RF.

Figure 12:
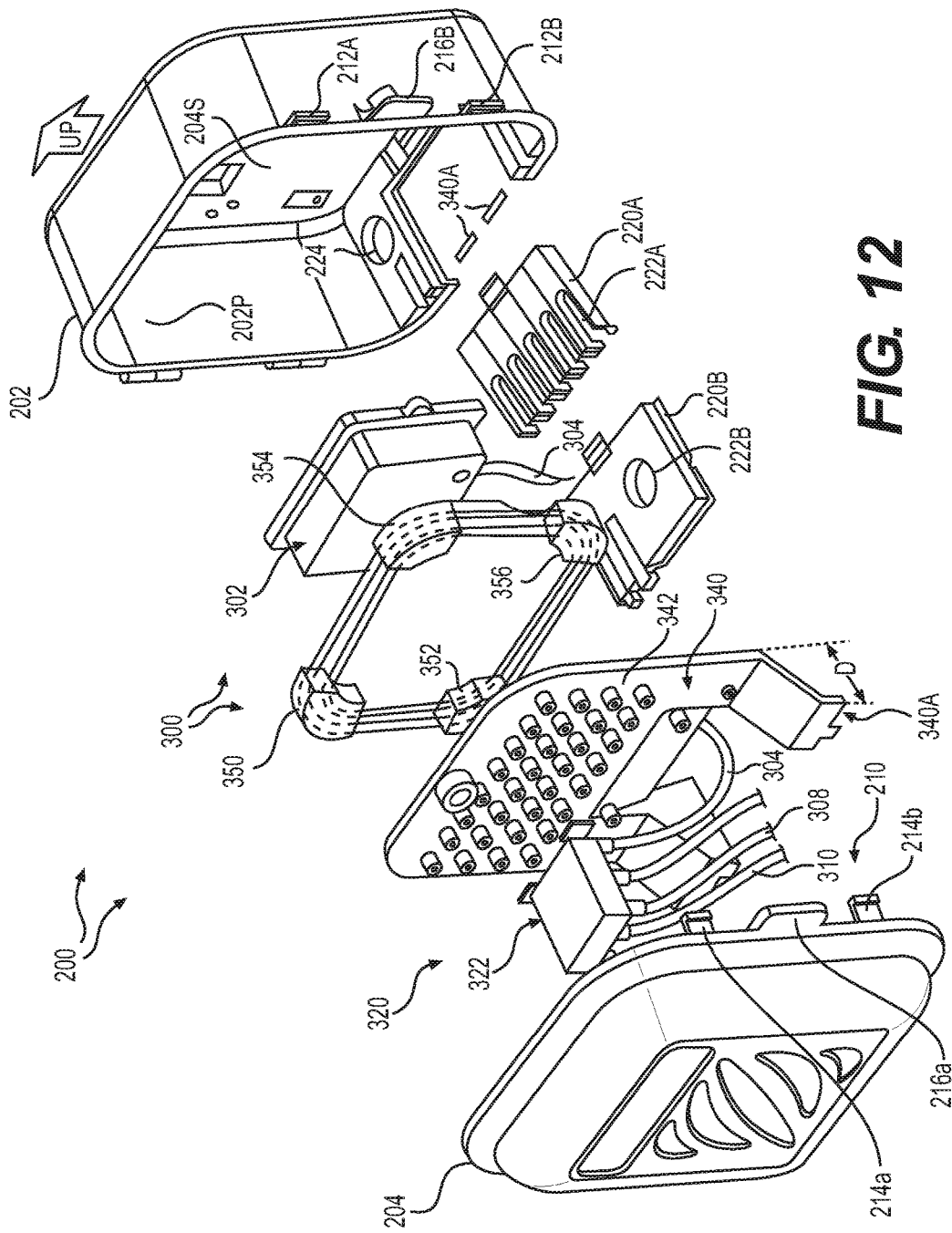
FIG. 12 shows an exploded view of a second embodiment of an exemplary telecommunication box in accordance with various aspects of the disclosure.
Figure 13:
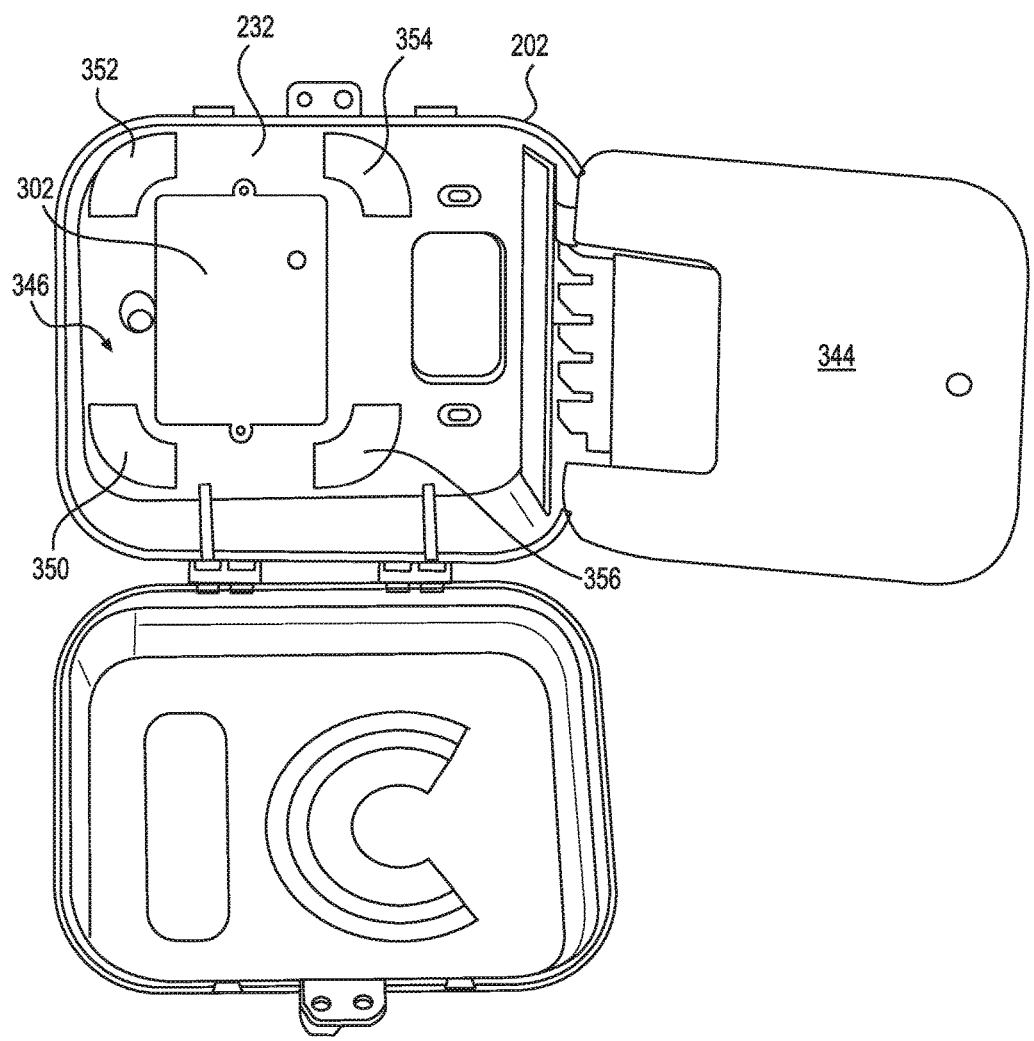
FIG. 13 shows a perspective view of the second embodiment of the exemplary telecommunication box with a segregating or hidden compartment panel in an open position and with components not yet installed.

FIGS. 12 and 13 illustrate a second embodiment of a universal multi-purpose compartmentalized telecommunication box 200 (or "entry box," "house box," or "fiber box") in accordance with various aspects of the disclosure. The second embodiment of the telecommunication box 200 is similar to the previously described box 100, but does not include the base plate 130 attached to the back wall 132 of the first housing portion 102.

As shown in FIGS. 12 and 13, the telecommunication box 200 is configured such that the converter 302 is mounted to the back wall 232 of the first housing portion 202. The pivoting panel 340 encloses a peripheral channel 346 formed between an inner peripheral surface 202P of the first housing portion 202 and a plurality of wrap guides 350, 352, 354, 356 extending from the back wall 232 of the first housing portion 202. The channel 346 is substantially rectangular in shape, conforming to the shape of: (i) the rectangular converter 302, (ii) the three peripheral sides 202P of the first housing portion 202 (projecting from the plane of the drawing sheet), and (iii) the backside wall surface 344 of the pivoting panel 340. The channel 346 produces a bend radius which is greater than the minimum bend radius of the fiber optic cable 324. It should be appreciated that the converter 302 may also be mounted to the under, or backside, surface 344 of the pivoting panel 340.

In this or any of the described embodiments, the first (or bottom) wall 220 of the first housing portion 202 may include a removable cable guide panel 220a, 220b. The cable guide panels 220a, 220b which are removable relative to the base 204 of the housing 200 to facilitate a variety of aperture configurations.

Figure 14:
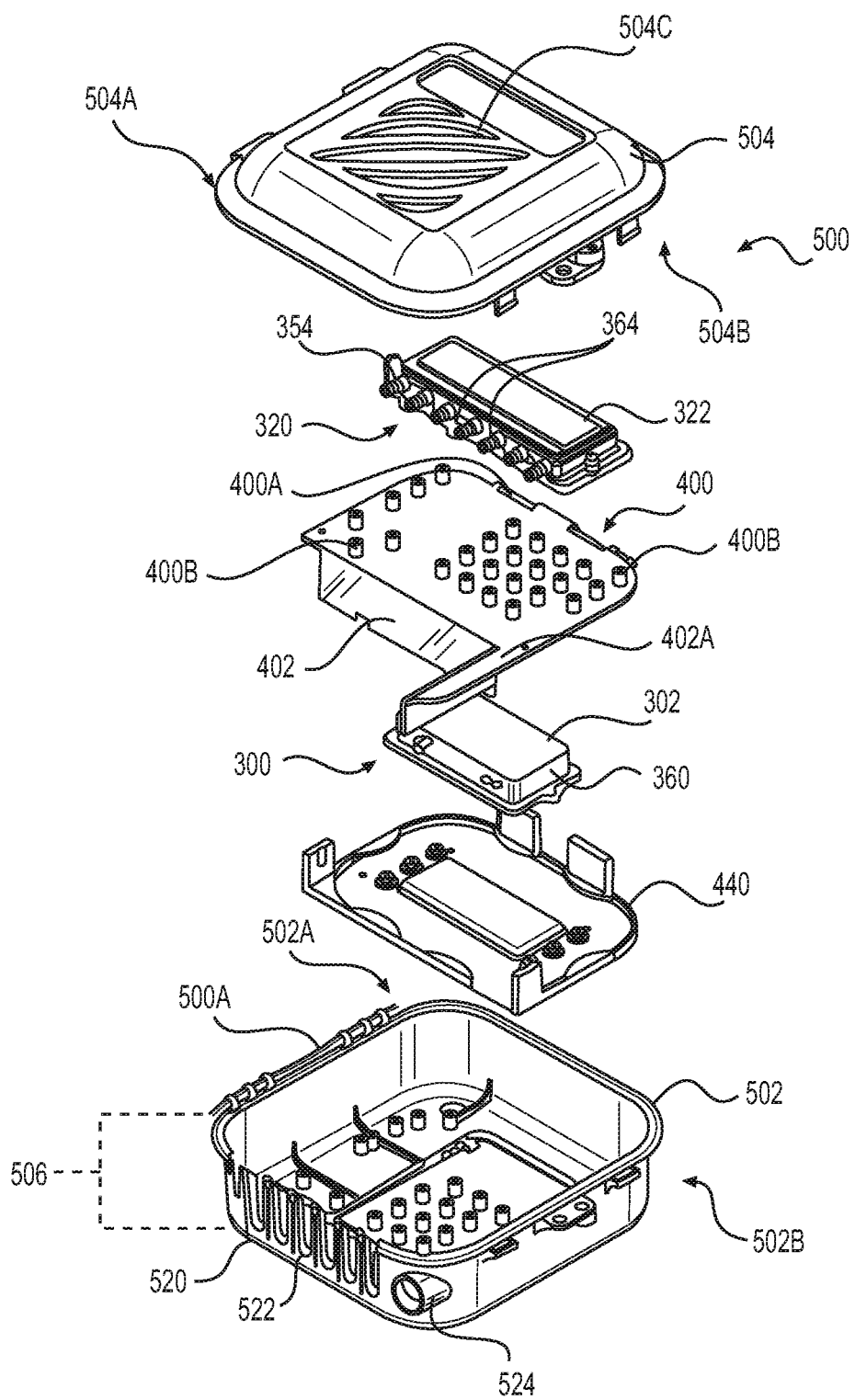
FIG. 14 shows an exploded view of a third embodiment of an exemplary telecommunication box in accordance with various aspects of the disclosure.
Figure 15:
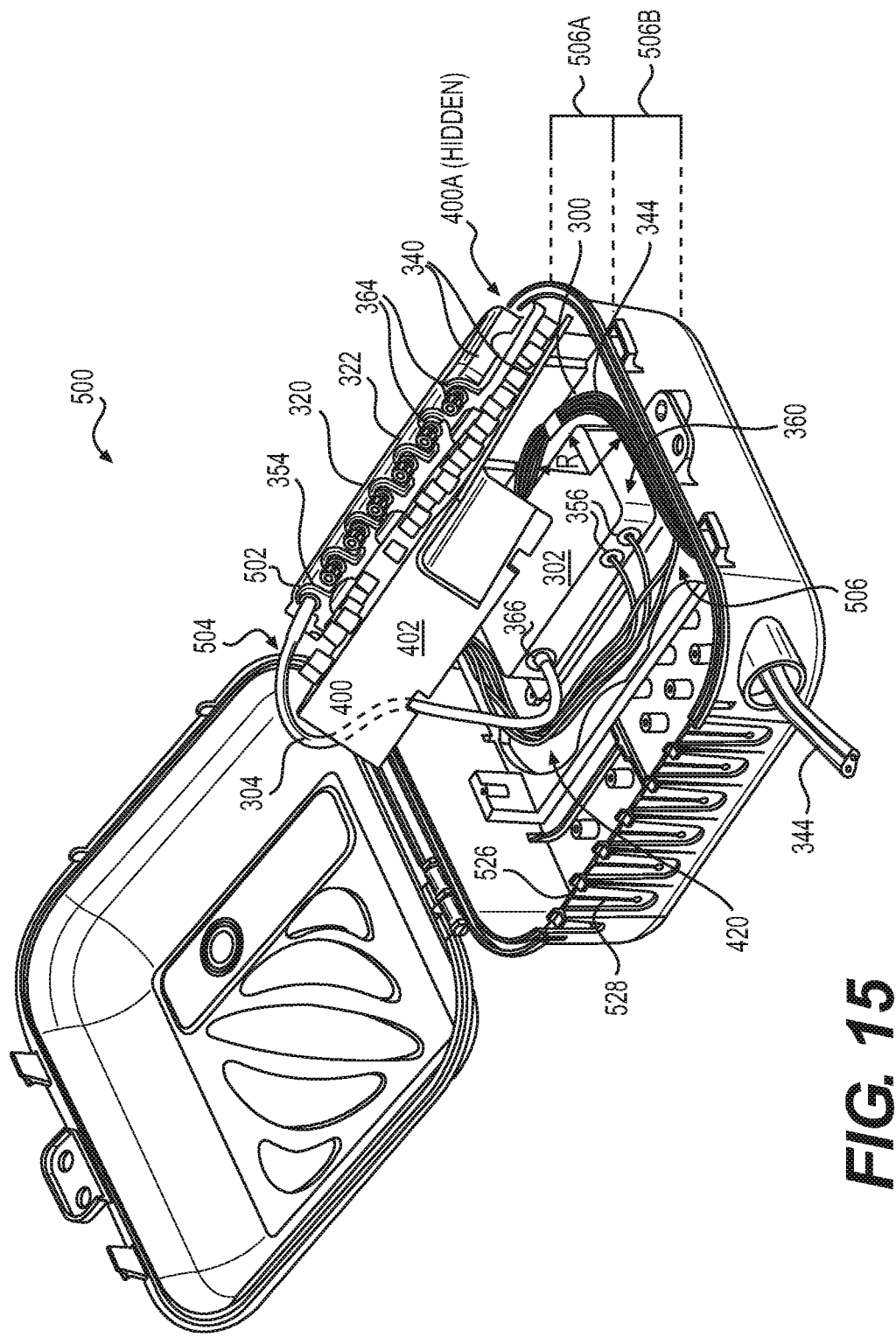
FIG. 15 shows a perspective view of the third embodiment of the exemplary telecommunication box with a segregating or hidden compartment panel in an open position.
Figure 16:
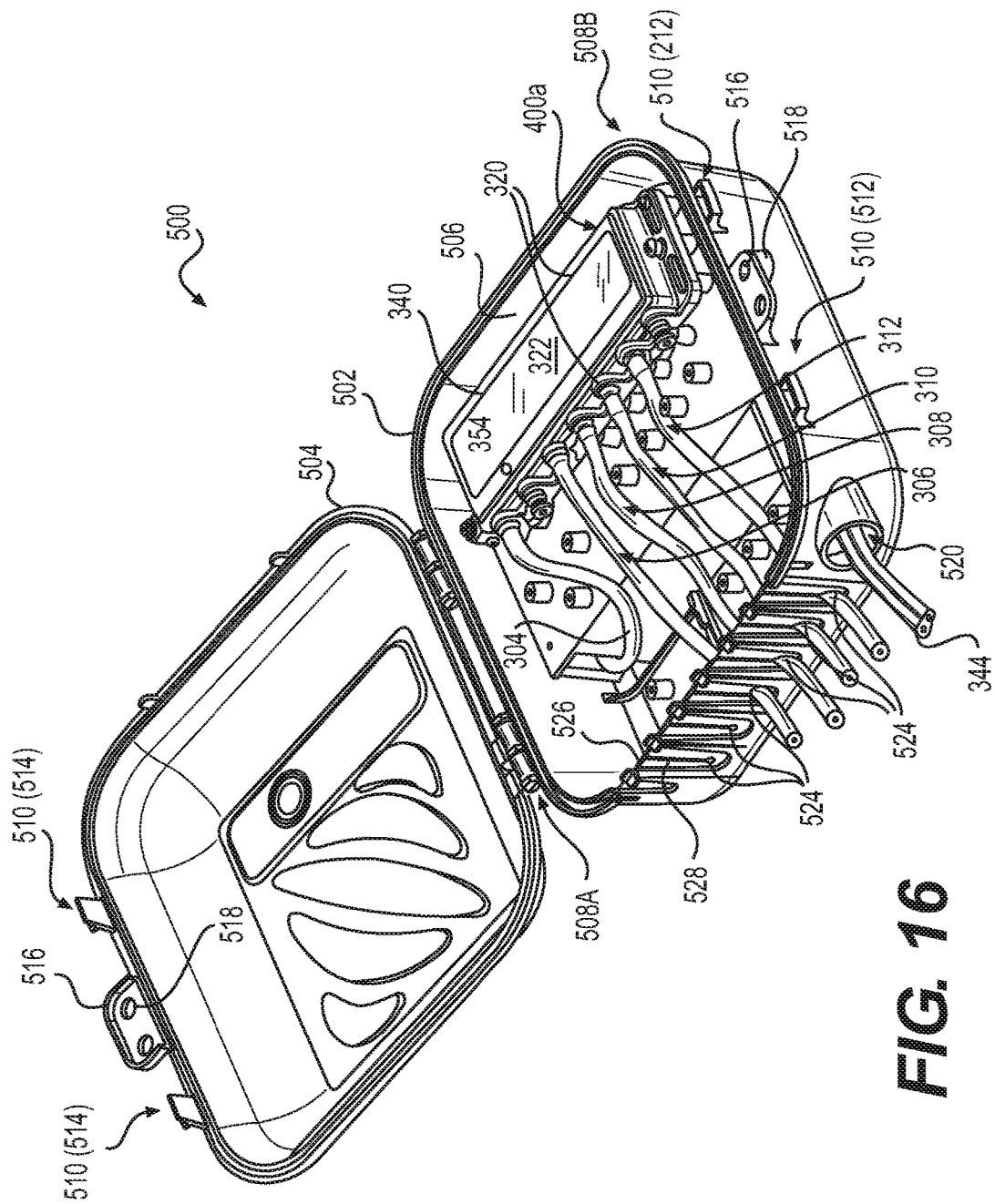
FIG. 16 shows a perspective view of the third embodiment of the exemplary telecommunication box with a segregating or hidden compartment panel in a closed position.

FIGS. 14-16 illustrate a third embodiment of a universal multi-purpose compartmentalized telecommunications box 500 (or "entry box," "house box," or "fiber box") in accordance with various aspects of the disclosure. In particular, FIG. 14 shows the parts of an embodiment of the telecommunications box 500 that may be configured to house multiple types of telecommunication system components, for example, fiber optic system components and RF system components. The telecommunications box 500 may comprise a housing including a first housing portion 502 and a second housing portion 504, that are permanently (or semi-permanently) pivotally joined together at corresponding first edges 502A, 504A allowing the box to pivotally open and close. For example, the first and second housing portions 502, 504 may be joined together by a box mounting hinge 500A that is configured to allow the first and second housing portions to pivotally open, such as, by a force that causes opposite corresponding second edges 502B, 504B of the first and second housing portions 502, 504 to move in opposite directions. The first and/or second housing portions 502, 504 may form an internal box cavity 506. As shown in the embodiments disclosed herein, a larger portion of the cavity 506 is located in first housing portion 502 than in the second housing portion. It should be appreciated that the cavity 506 may be split between the housing portions 502, 504 and/or modified as desired). When the telecommunication box 500 is closed, the box 500 forms an enclosure that can provide protection from weather, fire, and/or theft of two or more telecommunications installation systems (and their respective installation components).

As shown in FIG. 14, the cavity 506 of the first and second housing portions 502, 504 may be configured to house/enclose components (fiber optic converter 302 and a cable splitter 322) of two different types of telecommunication systems 300, 320. The fiber optic converter 302 and cable splitter 322 may be separated by panel 400. Accordingly, the telecommunication box 500 may provide both fiber optic and coaxial cable systems 300, 320 each having at least one different type of telecommunication system component 302, 322.

The lower housing portion 502 (or upper housing portion 504) may further include a wall 520 having one or more elongate apertures or slits 522 to receive telecommunication cables while preventing the infiltration of debris (e.g., leaves, soil, pollen) into the cavity 506. The openings or apertures 522 of the housing 500 may employ a simple gasket (not shown) through which a fiber cable 344 may be fed or a bulkhead connection (also not shown) may be employed. A bulkhead connection may employ a pre-terminated fiber module installed between an internal wall/bulkhead and the internal fiber-optic component (converter 302). Upper housing 504 may be further provided with oval-shaped, diagonal openings for ventilation 504C. The secure enclosure or enclosable box 100 may be configured to provide a compartment clearance so as to provide universal flexibility when choosing components, irrespective of the service provider. This modular system may be pre-installed and/or pre-fabricated (to be provided to a technician for field installation).

As shown in FIGS. 14-16, the housing 500 may include a segregating component panel 400 that is configured to define a compartment within the box cavity that separates the coaxial splitter 322 from the fiber optics converter 302 (although other components may be substituted as necessary). The segregation panel 400 may be configured to allow one of the component 302, 322 to be mounted to either side of the panel 400 (shown in FIGS. 14-16 configured to mount component 322 to the upper surface of panel 400).

One or more panel mounting hinges 400A may be provided to pivotally attach the segregation component panel 400 and a component compartment base member 440. The panel 400 may be provided with a pivoting mechanism. For example, panel mounting hinges 400a. The edge of the box where panel mounting hinges 400a are located may be an edge that is different than the edge 508a (FIG. 16) where box mounting hinges 500a are located, but the panel mounting hinges may be provided on any edge of the housing portion 502. The panel hinge 400a may be configured to allow the panel 400 to open by pivoting relative to a base member 400 (thereby allowing access to components mounted beneath the segregating component panel 400 or to the underside thereof). As such, the hinged panel configuration of the telecommunication box 500 provides the service technician with additional options/choices when choosing telecommunication equipment/components and the manufacturers of such equipment/components. Furthermore, the telecommunication box 500 provides a standardized approach to combining the telecommunications equipment/components 302, 322 while maintaining a safe and effective approach to handling, maintaining and modifying the components 302, 322.

FIG. 14 shows the hidden component compartment upper panel or door 400 may be configured to attach to a hidden compartment base or floor 440 that are each configured to have side edge surfaces that conform to the shape of an inner surface of the lower housing 502. The component compartment base member 440 may have an external lower back (non-mounting) surface that is configured to rest substantially flush with the inner surface of housing 502. Further, the base member 440 may have two sets of vertically protruding portions (four shown in FIG. 14). The vertical protruding portions may (as discussed below) be configured to provide a boundary ensuring a minimum permissible bend radius of fiber-optic cables and/or include pivotally movable mounting portions (e.g., hinges) at the protruding end of the vertically protruding portions. Moreover, as shown in FIG. 14, the base member 440 may be configured to conform to mimic the shape of lower surface 502. The hidden compartment upper panel or door 400 may include mini protruding portions 400b that are configured to allow for installation of a specific type of telecommunication component (a coaxial configuration is shown, but other telecommunication configurations may be desirable).

Moreover, hidden compartment upper panel or door 400 may be provided with an extending side portion 402, which may extend back toward base member/compartment floor 440 such that the extending portion 402 of the upper panel 400 touches or nearly touches the compartment floor 440. In this configuration, the panel 400 may further include a cord extension portion 402A, which may extend the panel 400 towards the opening 520. In this respect, the panel 400, with extending portions 402 and 402A may completely (or nearly completely) enclose all components directed towards the first telecommunication system 300 (e.g., fiber converter 302, other fiber components). Thus, the upper panel 400 and lower compartment floor (base member) 440 provide partitioning or segregation of the first telecommunication system 300. Thus, a telecommunication service provider, may be able to install components outside of or on top of (mounted on top of) panel 400 without worrying about component 302 being disturbed (i.e., a coaxial cable only installer may install coaxial cable in a fiber box without being allowed access to the fiber portion of the box). In FIG. 14, the hidden compartment base or floor 440 may be configured to be mounted by the component 302, such as, including two sets of three protruding cam portions.

To facilitate retrofitting/modification of existing entry boxes, it may be desirable to produce a pre-fabricated retrofit kit or assembly comprising: the base plate 440 (see FIG. 14) inserted within and affixed to the first housing portion 502 and a segregation panel 400 hinge-mounted to the base plate/member 440. The axis of the compartment hinge 400A of the segregation component panel 400 may be orthogonal to the hinge-axis of the box mounting hinge 500A. In this embodiment, the fiber optic converter 302 may be affixed to the base plate 440 while the coaxial cable splitter 322 is mounted to the segregating panel 400. It will also be appreciated that the fiber-optic converter 302 may be affixed to the underside of the segregating panel 400.

The features of the third embodiment in FIG. 14 are shown in more detail in FIGS. 15 and 16. In particular, FIGS. 15 and 16 show how the panel 400 of the house box 500 may provide an upper (easily accessible) compartment 506A and an internal (hidden) enclosable component compartment 506B. FIG. 15 shows the upper component compartment 506A being accessible when the panel 400 is in an open configuration (the panel 400 has an unhinged, unmounted end opposite the mounted hinge 400a that is raised vertically above the mounted hinge 400A).

As shown in FIGS. 14-16, the panel 400 may be configured such that components of a first telecommunication system 300 (e.g., fiber optic converter 302) may be disposed within the internal enclosable compartment 406 and, thus, segregated from a second separate type of telecommunication system 320 (e.g., coaxial cable components, such as, splitter 322, amplifiers, transformers, power converters, etc.) resting above the nested compartment 506B and separating component panel 400. The segregation of respective components from different telecommunication systems prevents, for example, a service technician from inadvertently interfering with, damaging, or degrading the performance of the components within the internal enclosed compartment.

In some embodiments, the telecommunication system component (the converter 302) may be provided along a side of the panel 400.

In FIG. 15, the panel 400 is shown as mounted on compartment base member 440 via hidden mounting hinges 400A. The separator panel 400 of FIGS. 14-16, segregates the first and second telecommunications systems 300, 320 by providing a component compartment (internal nested cavity) 506B within the larger enclosure/box cavity 506. In some embodiments, the compartment 506B may be a size that is large enough to house a converter 302 and a channel 420 (described below). More specifically, the panel 400 may provide a component compartment 506B that segregates components related to the first telecommunication systems 300 (e.g., converter 302 and fiber optic input cable 344 which is disposed through the input aperture 520, and may be forced to travel around converter 302 via channel 420) from the remaining components (which may be directed towards another different telecommunications system), such as, splitter 322.

The panel 400 (as shown) may be configured to enclose a peripheral channel 420 formed between an outer periphery 360 of the fiber-optic component 302 and the lower housing portion 502. More specifically, the channel 420 may be a substantially rectangular shaped channel that ensures a maximum bend radius R (at each of the four corners of the rectangular channel 420) which is greater than the minimum bend radius r of a fiber optic cable (e.g., fiber optic cable 344).

To ensure the bend radius is proper, the channel 420 may provide a channel that encircles the component 302. The channel may be configured to ensure the fiber optic cable 344 is properly shaped by utilizing three sides of the lower housing 502 in conjunction with the extending panel portion 402. In other words, the channel 420 may have a width dimension (i.e., the dimension between fiber-optic system component 302 and the lower housing portion 502, and/or the vertical wall 402 of the panel 400) which produces a maximum bend radius R (at each of the four corners of the rectangular channel 420) which is greater than the minimum permissible bend radius r of the fiber optic cable 344. That is, the geometry of the channel 420 allows the fiber optic cable to follow an arcuate path or bend R which exceeds the minimum bend radius r of the fiber optic cable 344. The bend radius R of the channel 420 must be greater than the minimum permissible bend radius r of the fiber optic cable 344 to prevent signal losses as the optical signal negotiates the arcuate path, curve or bend at each corner of the channel 420. As the bend radius R of an optic fiber or filament decreases, the incident light energy is not fully reflected internally of the optic filament. That is, the light energy is refracted out of the filament causing a portion of the light energy to be absorbed, or a portion of the signal to be lost. As the level of refraction increases, signal quality decreases.

FIG. 16 shows a perspective view of the first embodiment of the secure enclosure or enclosable box of FIG. 15 with the segregating or hidden compartment panel 400 now in a closed state or position. The closed state/position is a state in which a component 322 for the second telecommunication system 322 may be installed while access is prevented/restricted to the component of the first telecommunication system 300 (hidden in FIG. 16). The optic signal carried by the cable 344 may be converted to a digital signal by the fiber-optic converter 302.

As shown in FIG. 16, fiber optic converter 302 may be configured to convert an optic signal into a digital signal for transmission. The digital signal may be conveyed to the cable splitter 322 from the converter 302 via a short coaxial input cable 304. The cable splitter 322 may split the received signal into multiple transmission signals, which may be subsequently output via coaxial output ports 364 attached to, for example, coaxial cables coaxial cables 306, 308, 310, 312 that exit the housing 500 through output apertures 524 (such that they may be fed to the connections at the nearby house or residence). The component 322 may comprise a coaxial input port 354, which may be configured to receive a signal from connected cable 304 from the fiber optic output port 366. Further, the fiber optic input port 356 of the fiber optics component 302 may be configured to receive a fiber optic input signal from fiber optic cable 344, which may be wrapped around the outer periphery 360 of the component 302. The second telecommunication system 320 may be a coaxial cable system 320 that includes a cable splitter 322 configured to split a signal received via the input cable 304 into multiple signals exiting via corresponding output cables 306, 308, 310, 312. Accordingly, the secure enclosure or box 100 may provide both fiber optic and coaxial cable systems 300, 320 each having at least one different type of telecommunication system component 302, 322.

As shown in FIG. 16, the housing portions 502, 504 may provide enclosure (box) mounting hinges along one edge 508A and include aligned locking tabs 510 along the opposite edge 508B (to facilitate opening/closing of the secure enclosure 100). The locking tabs 510 may be a molded U-shaped opening 512 on the opposite edge in one of the housing portions 502, 504 and a resilient clasp 514 integrally formed in the same opposite edge of the other of the housing portions 502, 504. The locking tabs 510 may be augmented by a lock hole fitting portion 516 having aligned apertures 518 configured to allow the opposite end of the housing portions 502, 504 to be closed/fastened together, such as, by a padlock. In some embodiments, the panel 400 may be configured in a similar manner, such that, the panel may have an opening/clasp mechanism to open the compartment. In other embodiments, the internal compartment 506B may be accessible via a back panel 502A. In such an embodiment, the panel may be permanently affixed so as to not provide easy access, via, for example, a tab/opening mechanism.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A compartmentalized enclosure for controlling access to different components in a telecommunications system comprising:
    a lower housing member shaped to define an outer perimeter portion and a cavity;
    a panel member configured to move between a closed panel position, where the panel member prevents access to equipment within the cavity, and an open panel position, where the panel member permits access to the cavity;
    wherein the panel member is disposed in the cavity of the lower housing member, and the panel member has a plurality of edges that are shaped to define a inner perimeter portion, the inner perimeter portion and the plurality of edges being configured to match and fit within the outer perimeter portion of the lower housing member so as to form a perimeter matching or substantially perimeter matching portion that prevents access to equipment within the cavity between the inner perimeter portion and the outer perimeter portion when the panel member is in the closed position.

2. The compartmentalized enclosure of claim 1, further comprising: an upper housing member configured to move between a closed housing position, where the upper housing member prevents access to equipment within the cavity, and an open housing position, where the upper housing member permits access to the cavity.

3. The compartmentalized enclosure of claim 1, wherein the outer perimeter portion has an outer rectangular shape, and the inner perimeter portion has an inner rectangular shape that matches and fits within the outer rectangular shape so as to form a rectangular substantially perimeter matching portion so as to prevent access to equipment within the cavity between the inner perimeter portion and the outer perimeter portion when the panel member is in the closed position.

4. The compartmentalized enclosure of claim 1, wherein the panel member includes an upper panel portion configured to prevent access to an upper portion of a fiber optical converter when the panel member is in the closed position, a sidewall panel portion configured to prevent access to a side portion of the fiber optical converter when the panel member is in the closed position, and an extension panel portion configured to prevent access to a fiber optical cable portion when the panel member is in the closed position.

5. An enclosure for controlling access to a fiber optical cable portion, a fiber optical converter, a coaxial input cable, a cable splitter, and a plurality of output cable portions comprising:
  a base housing portion having a lower wall portion configured to partially house a first lower portion of a fiber optical cable portion and a second lower portion of a fiber optical converter, a first sidewall portion, a second sidewall portion adjacent to the first sidewall portion, a third sidewall portion adjacent to the first sidewall portion, and a fourth sidewall portion adjacent to the second and third sidewall portions;
  a segregation panel configured to move between a closed position, where the segregation panel prevents access to the fiber optical converter and prevents access to the fiber optical cable portion, and an open position, where the segregation panel is configured to allow access to the first upper portion of the fiber optical cable portion and allow access to the second upper portion of the fiber optical converter;
  wherein the segregation panel includes an upper panel portion configured to prevent access to an upper portion of the fiber optical converter when the segregation panel is in the closed position, a sidewall panel portion configured to prevent access to a side portion of the fiber optical converter when the segregation panel is in the closed position, and an extension panel portion configured to prevent access to the fiber optical cable portion when the segregation panel is in the closed position;
  wherein the upper panel portion of the segregation panel includes a first edge portion configured to fit within the first sidewall portion of the base housing portion so as to prevent access to the upper portion of the fiber optical converter between the first edge portion and the first sidewall portion when the segregation panel is in the closed position;
  wherein the upper panel portion of the segregation panel includes a second edge portion configured to fit within the second sidewall portion of the base housing portion so as to prevent access to the upper portion of the fiber optical converter between the second edge portion and the second sidewall portion when the segregation panel is in the closed position;
  wherein the upper panel portion of the segregation panel includes a third edge portion configured to fit within the third sidewall portion of the base housing portion so as to prevent access to the upper portion of the fiber optical converter between the third edge portion and the third sidewall portion when the segregation panel is in the closed position;
  wherein the sidewall panel portion of the segregation panel includes a lower edge portion configured to fit within the lower wall portion of the base housing portion so as to prevent access to the side portion of the fiber optical converter between the lower edge portion and the lower wall portion of the base housing when the segregation panel is in the closed position;
  wherein the extension panel portion of the segregation panel includes a first edge panel extension portion that is configured to fit within the fourth sidewall portion of the base housing portion so as to prevent access to the fiber optical cable portion between the first edge panel extension and the fourth sidewall portion when the segregation panel is in the closed position; and
  wherein the extension panel portion of the segregation panel includes a second edge panel extension portion that is configured to fit within the third sidewall portion of the base housing portion so as to prevent access to the fiber optical cable portion between the second edge panel extension and the third sidewall portion when the segregation panel is in the closed position.

6. The enclosure of claim 5, wherein the fiber optical cable portion, the fiber optical converter, the coaxial input cable, the cable splitter, and the plurality of output cable portions are configured to be connected to one another when the segregation panel is in the closed position.

7. The enclosure of claim 6, wherein the segregation panel is configured to allow access to the fiber optical cable portion and the fiber optical converter when the segregation panel is moved to the open position without having to disconnect the fiber optical cable portion, the fiber optical converter, the coaxial input cable, the cable splitter, or the plurality of output cable portions.

8. The enclosure of claim 5, wherein the segregation panel is configured to allow access to the fiber optical cable portion and the fiber optical converter when the segregation panel is moved to the open position without having to disconnect any one of the fiber optical cable portion, the fiber optical converter, the coaxial input cable, the cable splitter, or the plurality of output cable portions.

9. The enclosure of claim 5, wherein the segregation panel includes an upper surface configured to be mounted to the cable splitter.

10. The enclosure of claim 5, further comprising: a base panel configured to encircle a plurality of fiber optical cable portions around the fiber optical converter when the segregation panel is in the open and closed positions.

11. The enclosure of claim 5, further comprising a base panel configured to maintain a minimum permissible bend radius of a plurality of fiber optical cable portions arranged around the fiber optical converter when the segregation panel is in the open and closed positions.

12. The enclosure of claim 11, wherein the base panel is configured to be coupled to the segregation panel.

13. An enclosure for controlling access to a fiber optical cable portion, a fiber optical converter, a coaxial input cable, a cable splitter, and a plurality of output cable portions comprising:
  a base housing portion having a lower wall portion configured to partially house a first lower portion of a fiber optical cable portion and a second lower portion of a fiber optical converter, a first sidewall portion, a second sidewall portion adjacent to the first sidewall portion, a third sidewall portion adjacent to the first sidewall portion, and a fourth sidewall portion adjacent to the second and third sidewall portions;

a segregation panel configured to move between a closed position, where the segregation panel prevents access to the fiber optical converter and prevents access to the fiber optical cable portion, and an open position, where the segregation panel is configured to allow access to the first upper portion of the fiber optical cable portion and allow access to the second upper portion of the fiber optical converter;

wherein the segregation panel includes an upper panel portion configured to prevent access to an upper portion of the fiber optical converter when the segregation panel is the closed position, a sidewall panel portion extending from the upper panel portion and configured to prevent access to a side portion of the fiber optical converter when the segregation panel is the closed position, and an extension panel portion extending from the upper panel portion and configured to prevent access to the fiber optical cable portion when the segregation panel is the closed position; and wherein the upper panel portion of the segregation panel includes a first edge portion configured to fit within the first sidewall portion of the base housing portion so as to prevent access to the upper portion of the fiber optical converter between the first edge portion and the first sidewall portion when the segregation panel is in the closed position.

14. The enclosure of claim 13, wherein the upper panel portion of the segregation panel includes a second edge portion configured to fit within the second sidewall portion of the base housing portion so as to prevent access to the upper portion of the fiber optical converter between the second edge portion and the second sidewall portion when the segregation panel is in the closed position.

15. The enclosure of claim 13, wherein the upper panel portion of the segregation panel includes a third edge portion configured to fit within the third sidewall portion of the base housing portion so as to prevent access to the upper portion of the fiber optical converter between the third edge portion and the third sidewall portion when the segregation panel is in the closed position.

16. The enclosure of claim 13, wherein the sidewall panel portion of the segregation panel includes a lower edge portion configured to fit within the lower wall portion of the base housing portion so as to prevent access to the side portion of the fiber optical converter between the lower edge portion and the lower wall portion of the base housing when the segregation panel is in the closed position.

17. The enclosure of claim 13, wherein the extension panel portion of the segregation panel includes a first edge panel extension portion that is configured to fit within the fourth sidewall portion of the base housing portion so as to prevent access to the fiber optical cable portion between the first edge panel extension and the fourth sidewall portion when the segregation panel is in the closed position.

18. The enclosure of claim 17, wherein the extension panel portion of the segregation panel includes a second edge panel extension portion that is configured to fit within the third sidewall portion of the base housing portion so as to prevent access to the fiber optical cable portion between the second edge panel extension and the third sidewall portion when the segregation panel is in the closed position.

19. The enclosure of claim 13, wherein the fiber optical cable portion, the fiber optical converter, the coaxial input cable, the cable splitter, and the plurality of output cable portions are configured to be connected to one another when the segregation panel is in the closed position.

20. The enclosure of claim 13, wherein the segregation panel is configured to allow access to the fiber optical cable portion and the fiber optical converter when the segregation panel is moved to the open position without having to disconnect any one of the fiber optical cable portion, the fiber optical converter, the coaxial input cable, the cable splitter, or the plurality of output cable portions.

21. The enclosure of claim 13, wherein the segregation panel includes an upper surface configured to be mounted to the cable splitter.

22. The enclosure of claim 13, further comprising: a base panel configured to encircle a plurality of fiber optical cable portions around the fiber optical converter when the segregation panel is in the open and closed positions.

23. The enclosure of claim 13, further comprising: a base panel configured to maintain a minimum permissible bend radius of a plurality of fiber optical cable portions arranged around the fiber optical converter when the segregation panel is in the open and closed positions.

24. The enclosure of claim 23, wherein the base panel is configured to be coupled to the segregation panel.

25. An enclosure for controlling access to a fiber optical component nested below a coaxial cable component comprising:

a base housing portion configured to at least partially house a fiber optical component, the base housing portion having a base wall portion, a first side wall portion, and a second side wall portion;

a segregation panel configured to move between a closed position, where the segregation panel prevents access to the fiber optical component and where the fiber optical component is nested below a coaxial cable component, and an open position, where the segregation panel is configured to allow access to the fiber optical component;

wherein the segregation panel includes an upper panel edge portion configured to prevent access to the fiber optical component between the upper panel edge portion and the first side wall portion of the base housing portion when the segregation panel is the closed position, and an extension panel edge portion configured to prevent access to the fiber optical component between the extension panel edge portion and the second side wall portion of the base housing portion when the segregation panel is the closed position.

26. The enclosure of claim 25, wherein the upper panel portion of the segregation panel includes a first edge portion configured to fit within the first sidewall portion of the base housing portion so as to prevent access to the upper portion of the fiber optical component between the first edge portion and the first sidewall portion when the segregation panel is in the closed position.

27. The enclosure of claim 25, wherein the upper panel portion of the segregation panel includes a second edge portion configured to fit within the second sidewall portion of the base housing portion so as to prevent access to the upper portion of the fiber optical component between the second edge portion and the second sidewall portion when the segregation panel is in the closed position.

28. The enclosure of claim 25, wherein the upper panel portion of the segregation panel includes a third edge portion configured to fit within the third sidewall portion of the base housing portion so as to prevent access to the upper portion of the fiber optical component between the third edge portion and the third sidewall portion when the segregation panel is in the closed position.

29. The enclosure of claim 25, wherein the sidewall panel portion of the segregation panel includes a lower edge portion configured to fit within the lower wall portion of the base housing portion so as to prevent access to the side portion of the fiber optical component between the lower edge portion and the lower wall portion of the base housing when the segregation panel is in the closed position.

30. The enclosure of claim 25, wherein the extension panel portion of the segregation panel includes a first edge panel extension portion that is configured to fit within the fourth sidewall portion of the base housing portion so as to prevent access to the fiber optical cable portion between the first edge panel extension and the fourth sidewall portion when the segregation panel is in the closed position.

31. The enclosure of claim 29, wherein the extension panel portion of the segregation panel includes a second edge panel extension portion that is configured to fit within the third sidewall portion of the base housing portion so as to prevent access to the fiber optical cable portion between the second edge panel extension and the third sidewall portion when the segregation panel is in the closed position.

32. The enclosure of claim 25, wherein the fiber optical component comprises a fiber optical converter connected to a fiber optical cable portion when the segregation panel is in the closed position, and the coaxial cable component comprises a cable splitter connected to a coaxial input cable extending from the fiber optical converter and connected to a plurality of output cable portions when the segregation panel is in the closed position, and the segregation panel is configured to allow access to the fiber optical cable portion and the fiber optical converter when the segregation panel is in the open position without having to disconnect the fiber optical cable portion, the fiber optical converter, the coaxial input cable, the cable splitter, or the plurality of output cable portions.

33. The enclosure of claim 25, wherein the fiber optical component and the coaxial cable component are connected together when the segregation panel is in the closed position, and the segregation panel is configured to allow access to the fiber optical cable portion and the fiber optical converter when the segregation panel is in the open position without having to disconnect the fiber optical component and the coaxial cable component from one another.

34. The enclosure of claim 25, wherein the coaxial cable component comprises a splitter and the segregation panel includes an upper surface configured to be mounted to the splitter.

35. The enclosure of claim 25, wherein the coaxial cable component comprises a splitter, the fiber optical component comprises a converter, and the segregation panel includes an upper surface configured to be mounted to the splitter so as to physically segregate the splitter from the converter, allow access to the splitter when the segregation panel is in the open and closed position, permit access to the converter when the segregation panel is in the closed position, allow access to the converter when the segregation panel is in the open position.

36. The enclosure of claim 25, further comprising a base panel configured to encircle a plurality of fiber optical cable portions around the fiber optical converter when the segregation panel is in the open and closed positions.

37. The enclosure of claim 25, further comprising a base panel configured to maintain a minimum permissible bend radius of a plurality of fiber optical cable portions arranged around the fiber optical converter when the segregation panel is in the open and closed positions.

38. The enclosure of claim 37, wherein the base panel is configured to be coupled to the segregation panel such that the segregation panel moves relative to the base panel when the segregation panel moves before the open and closed positions.

39. The enclosure of claim 25, further comprising: a lower panel edge portion configured to prevent access to the fiber optical component between the lower panel edge portion and the base wall portion of the base housing portion when the segregation panel is the closed position.

40. The enclosure of claim 2, further comprising: two mounting hinges provided on a same side of the lower housing member so as to connect the lower housing member with the panel member, wherein an entry hole is formed in between the two mounting hinges and provides clearance for external cables/cords to enter into the enclosure and be provided to an internal compartment and/or a portion of a cavity of the enclosure outside of the internal compartment.

41. The enclosure of claim 40, wherein
the panel member, when closed, is configured to provide a secure enclosure for housing a first type of telecommunications system component within the internal compartment, and
the enclosure is configured to, when the enclosure and the panel member are both closed, provide a secure enclosure for housing a second type of telecommunications system component in the portion of the cavity of the enclosure outside of the internal compartment.

42. The enclosure of claim 40, wherein the box hinge side of the lower housing member includes one or more apertures that are configured to feed wires from a second type of telecommunications system component to an exterior of the enclosure, thereby facilitating the persistent connection of the second type of telecommunications system component inside the enclosure regardless of whether the panel is in an open or closed position.

43. The enclosure of claim 2, further comprising: two mounting hinges provided on a same side of the upper and lower housing members so as to connect the upper and lower housing members, wherein an entry hole is formed in the connected upper and lower housing members in between the two mounting hinges and provides clearance for external cables/cords to enter into the enclosure and be provided to an internal compartment and/or a portion of a cavity of the enclosure outside of the internal compartment.

44. The enclosure of claim 1, wherein the lower housing member has a plurality of walls shaped to define the cavity, and
wherein each of the plurality of walls has an interior surface facing the cavity, the interior surfaces being shaped to define the outer perimeter portion.

45. The enclosure of claim 1, wherein the different components in the telecommunication system include a fiber optical cable portion, a fiber optical converter, a coaxial input cable, a cable splitter, and a plurality of output cable portions;
wherein the lower housing member has a lower wall portion configured to partially house a first lower portion of the fiber optical cable portion and a second lower portion of the fiber optical converter, a first sidewall portion, a second sidewall portion adjacent to the first sidewall portion, a third sidewall portion adjacent to the first sidewall portion, and a fourth sidewall portion adjacent to the second and third sidewall portions;
wherein the panel member is configured to prevent access to the fiber optical converter and to the fiber optical cable portion in the closed position, and wherein the panel member is configured to allow access to an upper portion of the fiber optical cable portion and allow access to an upper portion of the fiber optical converter in the open position;

wherein the panel member includes an upper panel portion configured to prevent access to the upper portion of the fiber optical converter when the panel member is in the closed position, a sidewall panel portion configured to prevent access to a side portion of the fiber optical converter when the panel member is in the closed position, and an extension panel portion configured to prevent access to the fiber optical cable portion when the panel member is in the closed position;

wherein the upper panel portion of the panel member includes a first edge portion configured to fit within the first sidewall portion of the base housing portion so as to prevent access to the upper portion of the fiber optical converter between the first edge portion and the first sidewall portion when the panel member is in the closed position;

wherein the upper panel portion of the panel member includes a second edge portion configured to fit within the second sidewall portion of the base housing portion so as to prevent access to the upper portion of the fiber optical converter between the second edge portion and the second sidewall portion when the panel member is in the closed position;

wherein the upper panel portion of the panel member includes a third edge portion configured to fit within the third sidewall portion of the base housing portion so as to prevent access to the upper portion of the fiber optical converter between the third edge portion and the third sidewall portion when the panel member is in the closed position;

wherein the sidewall panel portion of the panel member includes a lower edge portion configured to fit within the lower wall portion of the base housing portion so as to prevent access to the side portion of the fiber optical converter between the lower edge portion and the lower wall portion of the base housing when the panel member is in the closed position;

wherein the extension panel portion of the panel member includes a first edge panel extension portion that is configured to fit within the fourth sidewall portion of the base housing portion so as to prevent access to the fiber optical cable portion between the first edge panel extension and the fourth sidewall portion when the panel member is in the closed position; and wherein the extension panel portion of the panel member includes a second edge panel extension portion that is configured to fit within the third sidewall portion of the base housing portion so as to prevent access to the fiber optical cable portion between the second edge panel extension and the third sidewall portion when the panel member is in the closed position.

46. The enclosure of claim 1, wherein the different components in the telecommunication system include a fiber optical cable portion, a fiber optical converter, a coaxial input cable, a cable splitter, and a plurality of output cable portions;

wherein the lower housing member has a lower wall portion configured to partially house a first lower portion of a fiber optical cable portion and a second lower portion of a fiber optical converter, a first sidewall portion, a second sidewall portion adjacent to the first sidewall portion, a third sidewall portion adjacent to the first sidewall portion, and a fourth sidewall portion adjacent to the second and third sidewall portions;

wherein the panel member is configured to prevent access to the fiber optical converter and to the fiber optical cable portion in the closed position, and wherein the panel member is configured to allow access to an upper portion of the fiber optical cable portion and allow access to an upper portion of the fiber optical converter in the open position;

wherein the panel member includes an upper panel portion configured to prevent access to an upper portion of the fiber optical converter when the panel member is the closed position, a sidewall panel portion extending from the upper panel portion and configured to prevent access to a side portion of the fiber optical converter when the panel member is the closed position, and an extension panel portion extending from the upper panel portion and configured to prevent access to the fiber optical cable portion when the panel member is the closed position; and wherein the upper panel portion of the panel member includes a first edge portion configured to fit within the first sidewall portion of the base housing portion so as to prevent access to the upper portion of the fiber optical converter between the first edge portion and the first sidewall portion when the panel member is in the closed position.

47. The enclosure of claim 1, wherein the compartmentalized enclosure is configured to control access to a fiber optical component nested below a coaxial cable component;

wherein the lower housing member is configured to at least partially house the fiber optical component, the lower housing portion having a base wall portion, a first side wall portion, and a second side wall portion;

wherein the panel member is configured to prevent access to the fiber optical component in the closed position, where the fiber optical component is nested below the coaxial cable component, and wherein the panel member is configured to allow access to the fiber optical component in the open position;

wherein the panel member includes an upper panel edge portion configured to prevent access to the fiber optical component between the upper panel edge portion and the first side wall portion of the base housing portion when the panel member is the closed position, and an extension panel edge portion configured to prevent access to the fiber optical component between the extension panel edge portion and the second side wall portion of the base housing portion when the panel member is the closed position.

* * * * *